US011687903B2

(12) United States Patent
Pinto et al.

(10) Patent No.: US 11,687,903 B2
(45) Date of Patent: Jun. 27, 2023

(54) INSTALLMENTS SYSTEM AND METHOD

(71) Applicant: Visa International Service Association, San Francisco, CA (US)

(72) Inventors: Sheryl Pinto, San Francisco, CA (US); Muhammad Khan, San Mateo, CA (US); Xiaodong Jiang, Foster City, CA (US); Dogan Duransoy, Piedmont, CA (US); Anuja Seton, San Francisco, CA (US); Wayne Boland, Aurora, CO (US); Chris Truelson, Highlands Ranch, CO (US); Eduardo Vaena, Danville, CA (US); Shashi Velur, Austin, TX (US); Mohammad Al-Bedaiwi, Round Rock, TX (US)

(73) Assignee: Visa International Service Association, San Francisco, CA (US)

( * ) Notice: Subject to any disclaimer, the term of this patent is extended or adjusted under 35 U.S.C. 154(b) by 68 days.

(21) Appl. No.: 16/682,755

(22) Filed: Nov. 13, 2019

(65) Prior Publication Data

US 2020/0151697 A1    May 14, 2020

Related U.S. Application Data

(60) Provisional application No. 62/805,857, filed on Feb. 14, 2019, provisional application No. 62/760,699, filed on Nov. 13, 2018.

(51) Int. Cl.
| | | |
|---|---|---|
| G06Q 20/40 | (2012.01) |
| G06Q 20/24 | (2012.01) |
| G06Q 40/03 | (2023.01) |
| H04L 9/40 | (2022.01) |

(52) U.S. Cl.
CPC .............. *G06Q 20/24* (2013.01); *G06Q 40/03* (2023.01)

(58) Field of Classification Search
CPC ....... G06Q 20/24; G06Q 40/025; G06Q 40/03
See application file for complete search history.

(56) References Cited

U.S. PATENT DOCUMENTS

| | | |
|---|---|---|
| 8,554,668 B2 | 10/2013 | Hogan |
| 8,622,308 B1 | 1/2014 | Field et al. |
| 9,785,933 B2 | 10/2017 | Silva |
| 2002/0077969 A1 | 6/2002 | Walker et al. |
| 2003/0037012 A1 | 2/2003 | Mersky et al. |

(Continued)

OTHER PUBLICATIONS

International Search Report and Written Opinion for PCT Application No. PCT/US2019/061152, filed Mar. 9, 2020, 12 pages.

*Primary Examiner* — Bennett M Sigmond
*Assistant Examiner* — Bhavin D Shah
(74) *Attorney, Agent, or Firm* — Kilpatrick Townsend & Stockton LLP

(57) ABSTRACT

A method includes receiving, by a network computer, a request message including interaction data for an interaction with a user. The interaction data includes an account identifier for an account of the user. The network computer determines that the interaction is eligible for an installment plan by analyzing the interaction data. Based on determining that the interaction is eligible for the installment plan, the network computer transmits data identifying the installment plan. The network computer receives acceptance of the installment plan by the user. Responsive to confirming the acceptance, the network computer initiates the installment plan.

13 Claims, 11 Drawing Sheets

(56) References Cited

U.S. PATENT DOCUMENTS

| | | | |
|---|---|---|---|
| 2007/0233615 A1* | 10/2007 | Tumminaro | H04L 63/08 |
| | | | 705/75 |
| 2009/0265262 A1 | 10/2009 | Chaudhari | |
| 2011/0238567 A1 | 9/2011 | Silva | |
| 2014/0122338 A1 | 5/2014 | Cueli et al. | |
| 2015/0058143 A1 | 2/2015 | Zeinfeld et al. | |
| 2017/0270603 A1* | 9/2017 | Berta | G06Q 20/4037 |
| 2018/0276640 A1* | 9/2018 | Kohli | G07G 5/00 |

* cited by examiner

INSTALLMENTS SYSTEM AND METHOD

CROSS-REFERENCE TO RELATED APPLICATIONS

This application is a Non-Provisional application and claims benefit of priority of U.S. Provisional Applications No. 62/760,699, filed Nov. 13, 2018 and 62/805,857, filed Feb. 14, 2019, the entire contents of which are incorporated herein by reference for all purposes.

BACKGROUND

Installment plans are a popular option for resolving interactions such as payment for goods or services. In an installment plan, payments may be spread out over fixed intervals such as monthly payments. An installment plan may be offered by a resource provider such as a merchant to entice a customer to purchase something. In other use cases, a bank may offer an installment plan to a user in exchange for interest or a fixed finance charge.

Commonly, installment plans require a new credit line to be opened for a customer, which can require analysis of the customer's creditworthiness and be time-consuming and expend resources. Additional challenges are posed in processing the installments. While one party to the transaction (e.g. a merchant or bank) may offer the installment plan, some of the risk may fall on another party (e.g., if the merchant does not receive full payment). Further, the installments are typically processed as multiple transactions. Thus, instead of processing one transaction, the parties must process and keep track of several transactions, which multiplies the amount of computing power, time, and storage needed to resolve an interaction.

Embodiments of the invention address this problem and other problems individually and collectively.

SUMMARY

Embodiments of the invention are related to methods and systems for installment setup and processing.

One aspect of the disclosure is directed to a computer-implemented method comprising: receiving, by a network computer, a request message comprising interaction data for an interaction with a user, the interaction data including an account identifier for an account of the user; determining, by the network computer, that the interaction is eligible for an installment plan by analyzing the interaction data; based on determining that the interaction is eligible for the installment plan, transmitting, by the network computer, data identifying the installment plan; receiving, by the network computer, acceptance of the installment plan by the user; and responsive to confirming the acceptance, initiating, by the network computer, the installment plan.

In some embodiments, the determining comprises determining that the interaction is eligible for a plurality of installment plans including the installment plan by analyzing the interaction data; and the transmitting comprises transmitting, by the network computer to a resource provider computer, the plurality of installment plans including the installment plan. In some embodiments, the installment plan is associated with a total amount, the method further comprising: creating, by the network computer, a temporary account for the installment plan and an identifier for the temporary account for the installment plan; and recording, by the network computer, the total amount to the temporary account associated with the account identifier.

In some embodiments, the request message includes a request for installment information received from a resource provider computer via a first Application Programming Interface (API); and the method further comprises receiving, by the network computer from the resource provider computer via a second API, an authorization request message for the interaction. In some embodiments, the request message is an installment information request message, the method further comprising: receiving, by the network computer, an authorization request message for the interaction from a resource provider computer; transmitting, by the network computer, the authorization request message for the interaction to an authorizing computer; receiving, by the network computer, an authorization response message for the interaction from the authorizing computer; transmitting, by the network computer, the authorization response message for the interaction to the resource provider computer; and transmitting, by the network computer, a plan confirmation message regarding the installment plan to the resource provider computer.

In some embodiments, method further includes receiving, by the network computer from an authorizing computer, installment plan parameters; storing, by the network computer, the received installment plan parameters in association with an identifier of the authorizing computer; retrieving, by the network computer, the stored installment plan parameters; and using the stored installment plan parameters, with the interaction data, to identify the installment plan. In some embodiments, method further includes transmitting, by the network computer to an authorizing computer, a first installment authorization message comprising a first amount, wherein the authorizing computer blocks a credit line of the user based on the first amount; and transmitting, by the network computer to the authorizing computer, a second installment authorization message comprising a second amount, wherein the authorizing computer blocks the credit line of the user based on the second amount.

In some embodiments, method further includes receiving, by the network computer from a resource provider computer via an Application Programming Interface (API) exposed by the network computer, a batch request to check installment plan eligibility for a plurality of accounts; determining, by the network computer, batch data comprising installment plan eligibility for each account, of the plurality of accounts; and providing, by the network computer, the batch data to the resource provider computer. In some embodiments, the API is a first API, the method further comprising: transmitting, by the network computer to the resource provider computer, a notification comprising a batch identifier corresponding to the batch data and a callback Uniform Resource Locator (URL); and receiving, by the network computer from the resource provider computer via a second API exposed by the network computer, a request for the batch data corresponding to the batch identifier, wherein providing the batch data is responsive to the request received via the second API.

In some embodiments, the interaction is between the user and a resource provider computer, and the interaction data further includes a resource provider identifier. In some embodiments, the user is a first user; and the interaction is a push interaction between the first user and a second user.

Another aspect of the disclosure is directed to a network computer programmed to perform any of the above-noted methods.

In some embodiments, the request message is received from a resource provider computer; the determining comprises determining that the interaction is eligible for a plurality of installment plans including the installment plan by analyzing the interaction data; and the transmitting comprises transmitting, by the network computer to the resource provider computer, a plurality of installment plans including the installment plan. In some embodiments, the request message is an installment information request message, the method further includes receiving an authorization request message for the interaction from a resource provider computer via a transport computer; transmitting the authorization request message for the interaction to an authorizing computer; receiving an authorization response message for the interaction from the authorizing computer; transmitting the authorization response message to the resource provider computer via the transport computer; and transmitting a plan confirmation message regarding the installment plan to the resource provider computer via the transport computer.

Another aspect of the disclosure is directed to a computer-implemented method including receiving, by a network computer from a resource provider computer, a settlement request associated with an installment plan and a total amount associated with a user account; transmitting, by the network computer to the resource provider computer, a settlement response associated with the installment plan and the total amount; configuring, by the network computer, an installment record, the installment record comprising a plurality of installment times; based on occurrence of an installment time, of the plurality of installment times in the installment record, transmitting, by the network computer to an authorizing computer, installment data associated with the installment record to an authorizing computer, wherein the authorizing computer transmits an installment payment request to a user responsive to receiving the installment data from the network computer.

In some embodiments, the installment record is a temporary account with a starting balance of the total amount. In some embodiments, the method further includes receiving, by the network computer from the authorizing computer, confirmation of an installment payment of an installment amount completed responsive to the installment payment request; and responsive to receiving the confirmation, updating, by the network computer, the installment record. In some embodiments, the method further includes providing, to a user device of the user, a Graphical User Interface (GUI) displaying the total amount, the installment amount, and a remaining amount.

In some embodiments, the method further includes blocking the user account for a block amount equal to the total amount; responsive to receiving confirmation of an installment payment completed responsive to the installment payment request, reducing the block amount by an amount of the installment payment to generate an updated block amount; and transmitting a notification of the updated block amount.

Another aspect of the disclosure is directed to a network computer programmed to perform any of the above-noted methods.

Further details regarding embodiments of the invention can be found in the Detailed Description and the Figures.

DETAILED DESCRIPTION

Figure 1:
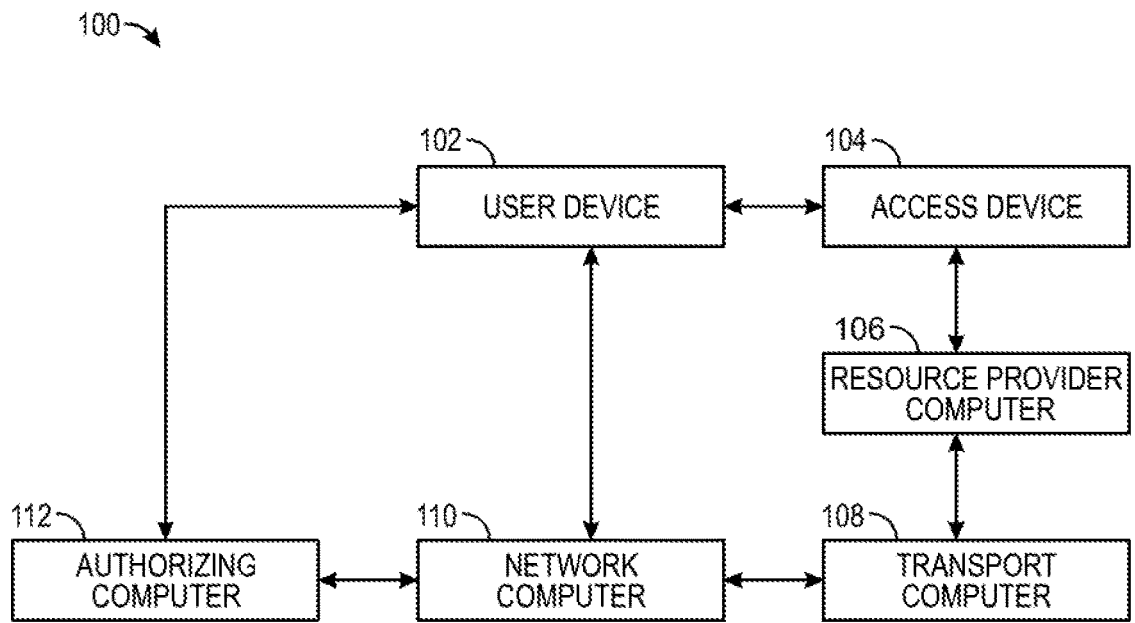
FIG. 1 shows a block diagram of a system according to some embodiments.

Embodiments include improved techniques for establishing and managing installment plans. The installment plans can be managed by a network computer (e.g., of a payment processing network) on behalf of parties such as resource providers (e.g., merchants) or issuers of accounts. The network computer may identify eligible installment plans before, during, or after a transaction. Installment plan eligibility may be determined based on factors such as resource provider preferences, issuer preferences, user data, transaction details such as the total amount of a transaction, and/or the like. The network computer may provide Application Programming Interfaces (APIs) for providing such services. By virtue of the network computer's access to different parties and data sets, the network computer is uniquely positioned to make informed determinations on installment plan eligibility.

The network computer may further manage the installment payments. In some embodiments, a temporary account is used to manage installment payments. The temporary account may be a prepaid account or a virtual account. The network computer may facilitate full payment of the transaction amount, then use the temporary account to compute and schedule installment payments. By processing the transaction in full, the merchant can receive the payment, reducing the number of parties involved in the installment processing. Further, by way of the virtual account, in some cases, only one transaction needs to be processed in full.

Transaction processing (e.g., from the point of initiating a transaction to settlement of funds) remains a time-consuming process involving multiple entities communicating a series of authorization request messages and authorization response messages. Current transaction settlement times, especially for settlement of transactions with small-to-medium businesses ("SMBs") or other small entities (e.g., individuals), can reach periods of up to days. The length of these transaction settlement times can be attributed to the currently employed payment processing architectures that involve communications across multiple processing networks required for fully settling a transaction (e.g., moving funds corresponding to the transaction from one entity to another entity).

For example, in a conventional payment process, a user may make a purchase online for a product. The resource provider selling the product can receive payment information from the user, and then communicate the payment information and transaction amount to an acquirer entity associated with the payment information. The acquirer entity, acting as an intermediary, can send an authorization request message to an authorizing entity via a payment processing network. The authorizing entity can analyze the transaction to determine if the user has sufficient funds to pay for the transaction and if the transaction is authentic. It can then generate and send an authorization response message back to the acquirer entity via the payment processing network.

After the acquirer entity receives the authorization response message, the transaction can be settled using a clearing and settlement process. After settlement, the resource provider can receive payment associated with the transaction from the authorizing entity, and the authorizing entity can invoice the user. The clearing and settlement process can be time-consuming due to the multiple communications between each entity. The time to settle the transaction can prevent the resource provider from receiving the funds in a timely manner. Thus, instead of being available for use by the resource provider, the funds are tied up until settlement has been finalized, limiting the resource provider's fungible assets.

Eliminating the need to communicate messages between multiple entities over multiple networks can greatly reduce processing time. This is particularly pertinent in the context of installment payments. For example, if a $500 television is paid for in five installments, traditionally, five transactions would be processed from start to finish, sending messages and waiting for responses from each of the parties described above multiple times.

Authorizing and clearing the total amount before settling the installments can reduce the number of communications required to complete a transaction. By reducing the number of hand-shaking processes via simplified installment processing techniques, the number of computational resources devoted to generating and processing transaction-related messages can be reduced or repurposed for processing additional transactions.

Prior to discussing embodiments of the invention, some terms can be described in further detail.

A "user" may include an individual. In some embodiments, a user may be associated with one or more personal accounts and/or mobile devices. The user may also be referred to as a cardholder, account holder, or consumer in some embodiments.

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "portable device" may include a device that is portable. In some embodiments, a portable device may in the form of a payment device such as a credit card, debit card, or prepaid card. In other embodiments, the portable device could have other forms including wearables (smart watches), vehicles (cars), and portable communication devices such as mobile phones. In some cases, the portable device may be separate from the user device. The portable device may also include a processor and a memory and may store credentials.

A "credential" may comprise any evidence of authority, rights, or entitlement to privileges. For example, access credentials may comprise permissions to access certain tangible or intangible assets, such as a building or a file. In another example, payment credentials may include any suitable information associated with and/or identifying an account (e.g., a payment account and/or a payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 (card verification code 3), etc. An example of a PAN is a 16-digit number, such as "4147 0900 0000 1234". In some embodiments, credentials may be considered sensitive information.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a user device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a user device. In some embodiments, a cellular phone, tablet, or other dedicated wireless device used as a POS terminal may be referred to as a mobile point of sale or an "mPOS" terminal.

An "interaction" can be a reciprocal action, effect, or influence. An interaction, for example, could be an exchange or transaction between two or more parties. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

An "Application Programming Interface" or "API" may include software specifying how components of a system should interact. The API may comprise a set of routines, protocols, and tools on which software applications may be built. An API may be used for a web-based system, operating system, database system, computer hardware or software library, and may include specifications for routines, data structures, object classes, variables and/or remote calls.

An "installment plan" or "installments plan" may be a scheme for dividing something across two or more events based on an installment time. For example, the event may be paying for a portion of a total amount, and the installment time may be a month (e.g., for monthly payments). In some cases, an installment plan may be linked to a new, unique line of credit. In some cases, an installment plan may be linked to a particular payment instrument such as a debit card or credit card. In some cases, the card may be a card issued specifically for installments (an "installments card"). Alternatively, the card may be a user's credit card, for which installments have been temporarily or permanently enabled, along with typical functionalities such as debit or traditional credit payment processing.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

A "resource provider computer" may be a computer operated by a resource provider. Suitable computers may include access devices, back end server computers, as well as combinations of the above.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be referred to as a "transport computer."

An "authorizing entity" may be an entity that authorizes a request. Examples of an authorizing entity may be an issuer, a governmental agency, a document repository, an access administrator, etc. An authorizing entity may operate an "authorizing computer." An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

"Interaction data" may include any suitable information associated with an interaction between an access device and a user device. Interaction data may include any suitable data associated with an interaction (e.g., a purchase transaction). In some embodiments, interaction data may include any suitable combination of: identification data associated with an access device (e.g., one or more identifiers of an access device), identification information associated with a user device (e.g., one or more identifiers associated with a user device), an interaction value (e.g., a transaction amount such as a preauthorization amount and/or purchase price of a transaction), payment data (e.g., a payment account identifier associated with a payment account), one or more locations each associated with an access device and/or a user device, or any suitable information. Examples of payment data may include a PAN (primary account number or "account number"), user name, expiration date, CVV (card verification value), dCVV (dynamic card verification value), CVV2 (card verification value 2), CVC3 card verification values, etc. CVV2 is generally understood to be a static verification value associated with a payment device. CVV2 values are generally visible to a user (e.g., a consumer), whereas CVV and dCVV values are typically embedded in memory or authorization request messages and are not readily known to the user (although they are known to the issuer and payment processors). Payment data may be any information that identifies or is associated with a payment account. Payment data may be provided in order to make a payment from a payment account. Payment data can also include a user name, an expiration date, a gift card number or code, and any other suitable information. Interaction data may relate to ticket information for an event, data to access a building, transit ticket information, passwords, biometrics or other credentials to access secure data, etc.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

A "virtual account" may be an account associated with a user. A virtual account can be a payment account that may be usable for processing a transaction. For example, a virtual account can be an account involving the processing of credit or debit values. In some examples, a virtual account may be a prepaid account, or may be generated for the purposes of storing a prepaid value in preparation of processing future transactions. In some examples, a virtual account can be identified using a virtual account number.

A "payment processing network" may be a network used to process transactions. A payment processing network can be a system that may comprise one or more servers, data processing subsystems, networks, and operations used to support and deliver authorization services, exception file services, and clearing and settlement services. A payment processing network may be able to process one or more of credit card transactions, debit card transactions, installment plans, or any other type of commercial transaction. An example of a payment processing network may include, for example, VisaNet™. A payment processing network may operate one or more "network computers."

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "processor" may include a device that processes something. In some embodiments, a process can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

Details of some embodiments of the present invention will now be described.

FIG. 1 shows a system 100 comprising a number of components according to some embodiments. The system 100 comprises a user device 102, an access device 104, a resource provider computer 106, a transport computer 108, a network computer 110, and an authorizing computer 112.

The user device 102 can be in operative communication with the access device 104, the network computer 110, and the authorizing computer 112. The access device 104 can be in operative communication with the resource provider computer 106 which can be in operative communication with the transport computer 108. The network computer 110 can be in operative communication with the transport computer 108, the user device 102, and the authorizing computer 112. The authorizing computer 112 can be in operative communication with the user device 102 and the network computer 110.

The components in system 100 can be in operative communication with each other through any suitable communication channel or communications network. Suitable communications networks may be any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. Messages between the computers, networks, and devices may be transmitted using a secure communications protocols such as, but not limited to, File Transfer Protocol (FTP); HyperText Transfer Protocol (HTTP); Secure Hypertext Transfer Protocol (HTTPS), Secure Socket Layer (SSL), ISO (e.g., ISO 8583) and/or the like.

For simplicity of illustration, a certain number of components are shown in FIG. 1. It is understood, however, that embodiments of the invention may include more than one of each component. For example, there can be a plurality of access devices 104 in operative communication with the resource provider computer 106.

The user device 102 can be any suitable device operated by a user. For example, in some embodiments, the user device 102 can be a mobile device. The user device 102 can be configured to receive installment plan information from, for example, the transport computer 108. The user device 102 can be configured to receive input from the user regarding a selection of an installment plan. The user device 102 can also be configured to transmit an indication of acceptance of the installment plan to the network computer 110. The user device may further be configured to initiate interactions (e.g., via a mobile wallet).

The access device 104 can receive data from the user device 102, or other suitable device operated by the user, and can perform an interaction, such as a transaction. The access device 104 may receive information about installment plan options and display such information to a user. The access device 104 may prepare and transmit messages such as authorization request messages for a transaction.

The resource provider computer 106 may be associated with a resource providing entity. The resource provider computer 106 may receive, transmit, and analyze messages such as authorization request messages, authorization response messages, and messages about installment plans. The resource provider computer 106 may generate settlement requests to request funds for resources provided. The resource provider computer 106 may be connected to the transport computer 108.

The transport computer 108 may be associated with the resource provider computer 106, and may manage authorization requests on behalf of the resource provider computer 106. In some embodiments of the invention, the transport computer 108 may be operated by an acquirer. In some embodiments, the transport computer may manage installment functions for a resource provider (e.g., by interacting with APIs exposed by the network computer 110 on behalf of the resource provider computer 106).

The authorizing computer 112 may be a system associated with an issuer or entity (e.g., a bank) that has a business relationship with a network computer 110 or other entity. The authorizing computer 112 may interact with a user to request and process installment payments. The authorizing computer 112 may receive, send, and analyze payment messages such as authorization request messages and authorization response messages.

The network computer 110 may be disposed between the transport computer 108 and the authorizing computer 112. The network computer 110 may include data processing subsystems, networks, and operations used to support and deliver authorization services, exception file services, and clearing and settlement services. For example, the network computer 110 may comprise a server coupled to a network interface (e.g., by an external communication interface), and databases of information. The network computer 110 may be or be part of a transaction processing network. The network computer 110 may expose a set of APIs to other entities to provide installments services. The network computer 110 may manage access to such APIs, e.g., by managing and issuing keys to entities to control access permissions. The network computer 110 may use any suitable wired or wireless network, including the Internet. Components and functionalities of the network computer 110 are further described below with respect to FIG. 2.

Figure 2:
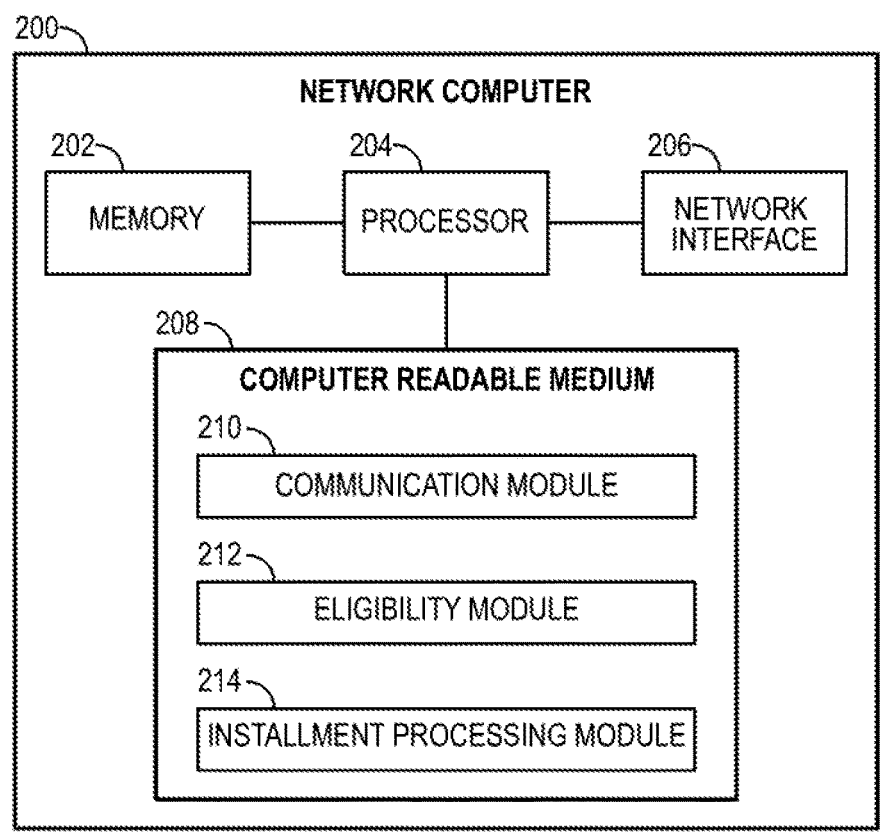
FIG. 2 shows a block diagram illustrating a network computer according to some embodiments.

FIG. 2 shows a block diagram of an network computer 200 according to some embodiments. The network computer 200 may comprise a processor 204. The processor 204 may be coupled to a memory 202, a network interface 206, and a computer-readable medium.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device.

The memory 202 may store a set of installment plan related data stores such as an installment plan criteria data store, an installment plan acceptance data store, and an installment plan search data store. The installment plan criteria data store may be a database storing installment plan criteria (also referred to herein as "installment plan parameters"), which may be criteria for offering an installment plan. The installment plan criteria can be singular values, a list of singular values, or a range of values or a list of range of values. Installment plan criteria may be configured by entities such as a resource provider (e.g., offer installments for transactions over $100, for users with a credit rating above 650, etc.). The installment plan acceptance data store may include criteria for accepting an installment plan. For example, although a resource provider may offer installments for transactions over $100, the network computer and/or authorizing computer may restrict installment plan offers based on criteria such as credit score or available balance. The installment plan search data store may store data such as a set of available installment plans, which may be searched to identify potential installment plans.

The network interface 206 may include an interface that can allow the network computer 200 to communicate with external computers. Network interface 206 may enable the network computer 200 to communicate data to and from another device (e.g., transport computer, authorizing computer, etc.). Some examples of network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by network interface 206 may include Wi-Fi™. Data transferred via network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium. The network interface 206 can utilize a long range communication channel as well as a short range communication channel.

The computer-readable medium 208 may comprise software code stored as a series of instructions or commands. The computer-readable medium 208 may comprise code, executable by the processor 204, to implement a method comprising: receiving, by a network computer, a request message comprising interaction data for an interaction with a user, the interaction data including an account identifier for an account of the user; determining, by the network computer, that the interaction is eligible for an installment plan by analyzing the interaction data; based on determining that the interaction is eligible for the installment plan, transmitting, by the network computer, data identifying the installment plan; receiving, by the network computer, acceptance of the installment plan by the user; and responsive to confirming the acceptance, initiating, by the network computer, the installment plan.

In some embodiments, the computer-readable medium 208 comprises code, executable by the processor 204, to implement a method comprising: receiving, by a network computer from a resource provider computer, a settlement request associated with an installment plan and a total amount associated with a user account; transmitting, by the network computer to the resource provider computer, a settlement response associated with the installment plan and the total amount; configuring, by the network computer, an installment record, the installment record comprising a plurality of installment times; and based on occurrence of an installment time, of the plurality of installment times in the installment record, transmitting, by the network computer to an authorizing computer, installment data associated with the installment record to an authorizing computer, wherein the authorizing computer transmits an installment payment request to a user responsive to receiving the installment data from the network computer.

The computer-readable medium 208 may include a communication module 210, an eligibility module 212, and an installment processing module 214. Each of these modules may include code configured to perform the functions described below in conjunction with the processor 204.

The communication module 210 may comprise code that causes the processor 204 to generate messages, forward messages, reformat messages, and/or otherwise communicate with other entities.

The eligibility module 212 may comprise code that causes the processor 204 to determine whether a particular user, account, or transaction is eligible for one or more installment plans. The eligibility module 212 may include code configured to, in cooperation with the processor 204, analyze interaction data and/or user data (which may include account data) to make such eligibility determinations.

The installment processing module 214 may comprise code that causes the processor 204 to manage transaction processing across multiple installments. The installment processing module 214 may, in cooperation with the processor 204, generate a temporary account associated with an installment plan. The installment processing module 214 may, in cooperation with the processor 204, determine a current installment and remaining installments. The installment processing module 214, in cooperation with the processor 204, may manage settlement of such installment payments.

In some embodiments, the network computer 200 may manage and expose a set of APIs. The APIs may include an onboarding API, an eligibility check API, a convert to installments API, and a scheduler API.

The onboarding API can include a suite of APIs which can register partners and can define metadata to enable installments, e.g., on a credit card. The onboarding API suite can include entity onboarding APIs, manage installment program and plans API, and/or various data retrieve APIs.

The partner onboarding APIs can include APIs to onboard partners for installment services. For example, partners can include authorizing entities, resource providers, and acquirers. The partners can define key attributes which can enable various engagement models for installment payments. Via the onboarding APIs, such entities may register for installment payments, create installment programs and plans, create a unique eligibility for an installment plan, create a cost structure for an installment plan, and so forth.

The manage installment program and plans API can define installment payment promotions with various payment plans of different tenues, cost and eligibility. The various data retrieve APIs can allow for different actors and different search criteria.

The eligibility check API (also referred to herein as an "installment eligibility check API") can allow for entities to look-up payment transaction eligibility for installment payments. The eligibility check API can perform transaction installment eligibility checks on behalf of issuers. The eligibility check API can also be extendible to look-up eligibility across different issuer systems and/or other authorized 3rd parties. Installment eligibility can be defined across various data attributes—such as, for example, global/market attributes, issuer/card attributes, merchant attributes and transaction attributes, etc. The API response can include the eligible installment plans for the interaction.

The convert to installments API can convert the original interaction, such as a payment transaction, to an installment, such as an installment payment transaction. The convert to installments API can convert the net financial effect of original payment transaction to an installment payment transaction and can set up a schedule for the subsequent installment payments. The convert to installments API can also accept identifiers for the transaction and installment plan. The convert to installments API response can include the activity status and the computed payment schedule for installment payments.

The scheduler API can be enable scheduling of payments for an installment interaction. Post installment payment charges on clearing house bank statements can be respective to the installment payment plan/schedules and other payment preferences. The scheduler API can allow for a look-up clearing house and original transaction status before posting installment payment charges. Also, in some embodiments, the network computer can host APIs for entities to advise on respective details. Additionally, APIs can allow for a look-up progress on payment schedule and total fee/charge applied with each transaction.

The network computer may maintain multiple APIs protected by different permissions and keys. This can be used to enhance security by only giving specific entities access to the appropriate API at an appropriate time. For example, some entities may be enrolled in the installment service, and other entities may not. A first API (e.g., the eligibility check API) may be exposed to enrolled entities for checking installment eligibility. A second API (e.g., an authorization API) may be exposed to a larger set of entities for authorization processing.

Figure 3:
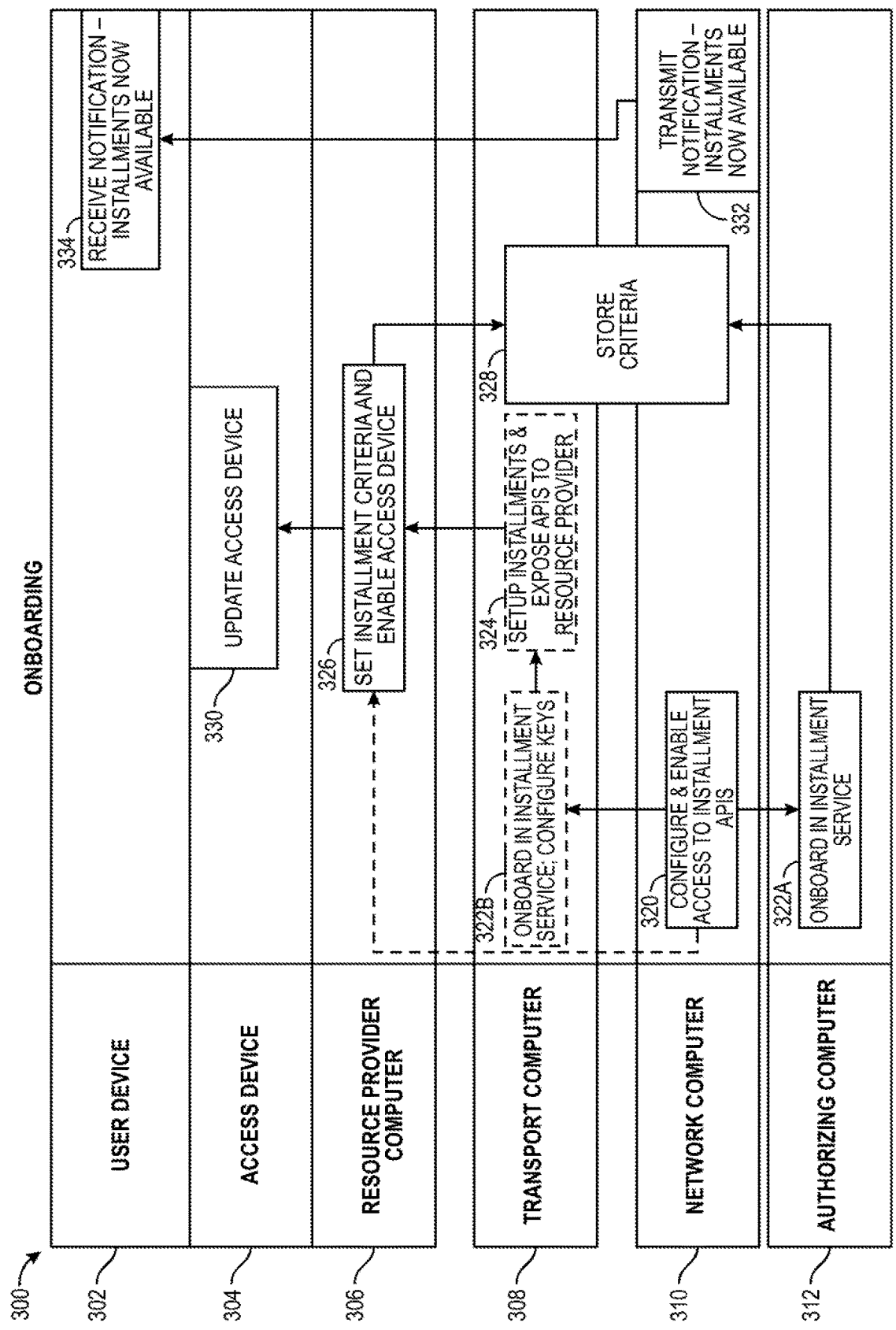
FIG. 3 illustrates a schematic diagram of installments onboarding operations according to some embodiments.
Figure 4:
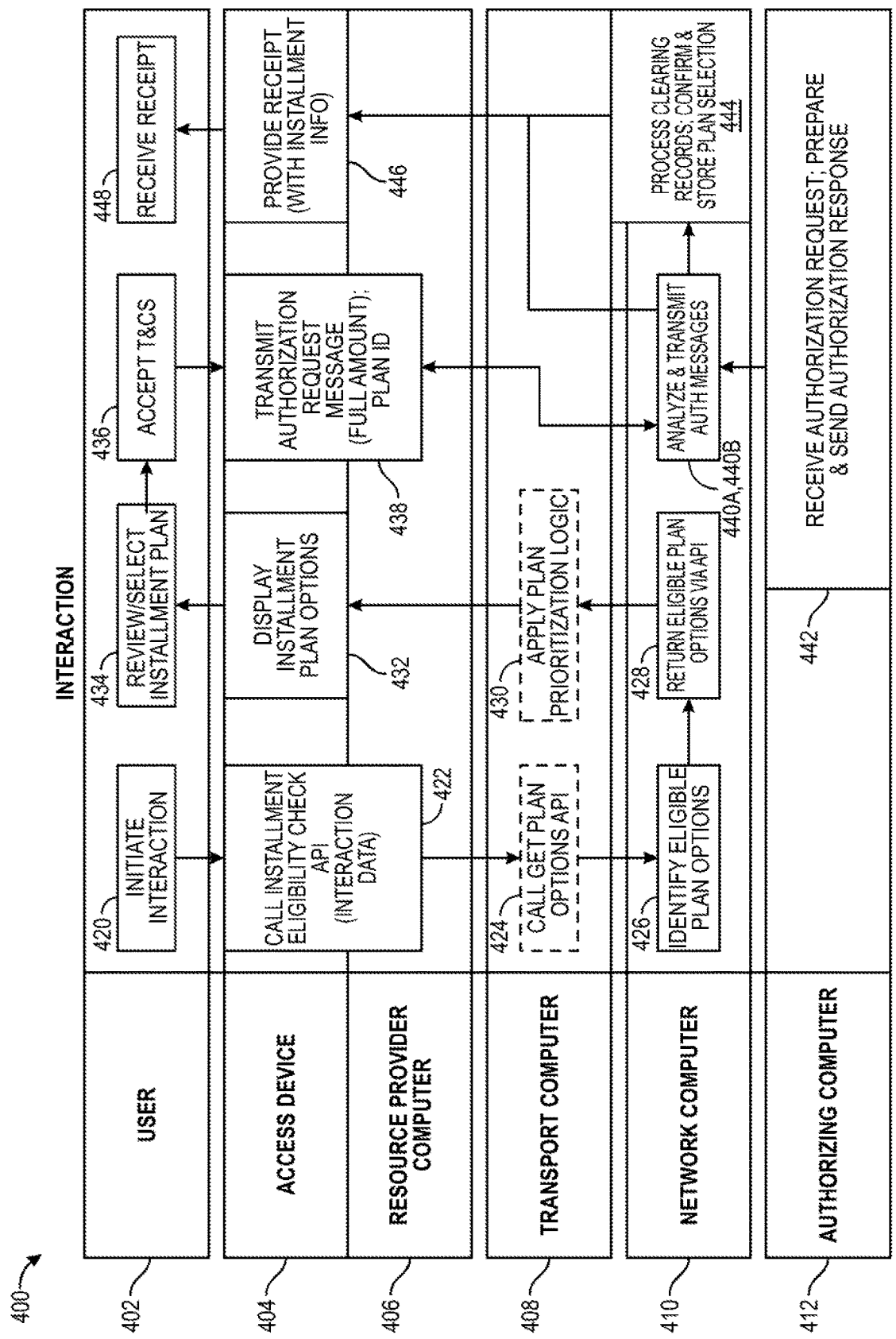
FIG. 4 illustrates a schematic diagram of selecting and establishing an installment plan during an interaction according to some embodiments.
Figure 5:
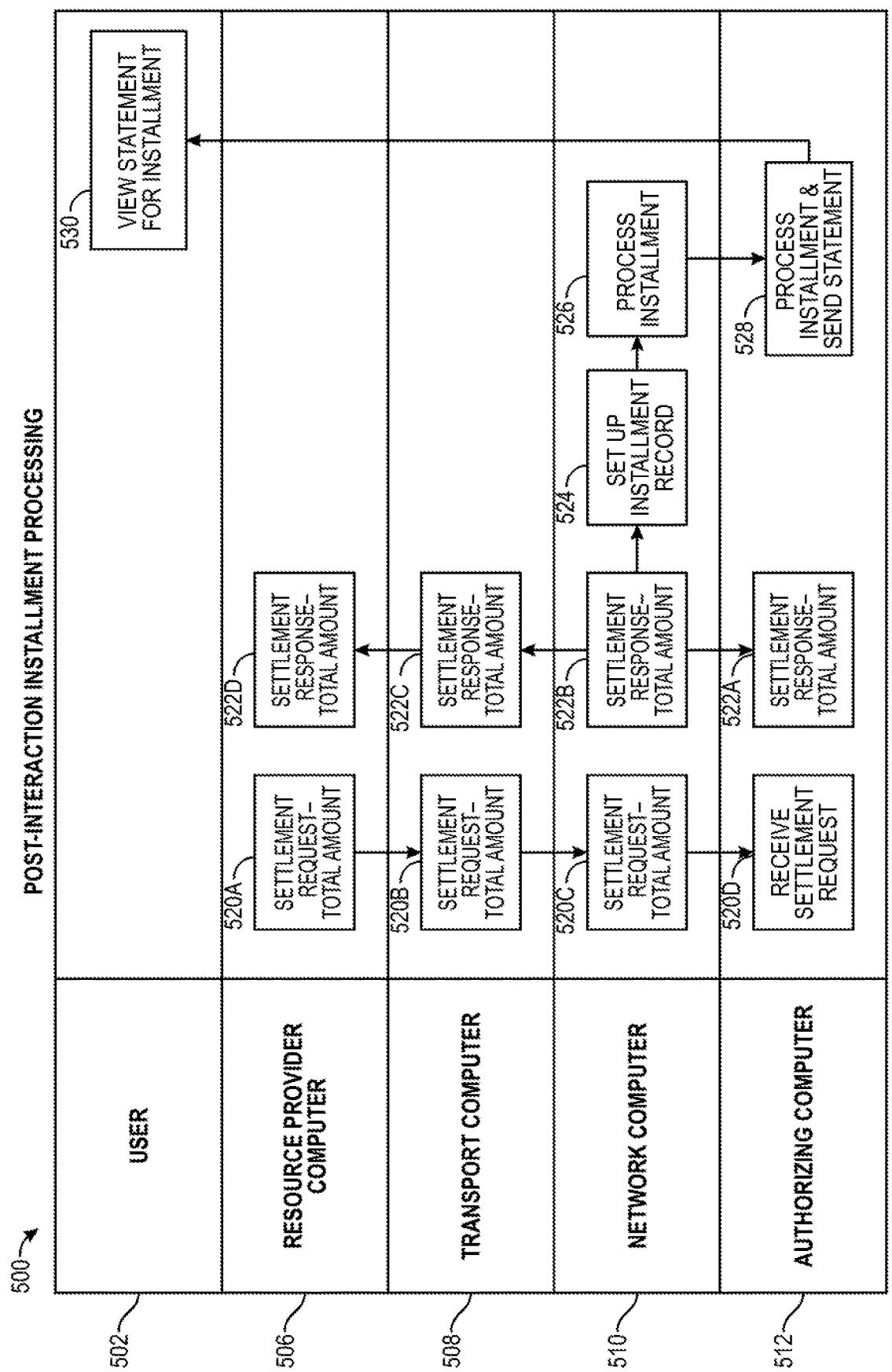
FIG. 5 illustrates a schematic diagram of post-interaction installment processing according to some embodiments.

FIGS. 3-5 provide an overview of installments techniques according to some embodiments. FIG. 3 illustrates a schematic diagram of techniques 300 for onboarding of the various entities that may be involved in installment program initiation and processing. FIG. 4 illustrates a schematic diagram of techniques 400 for selecting and establishing an installment plan during an interaction according to some embodiments. FIG. 5 illustrates a schematic diagram of techniques 500 for post-interaction installment processing according to some embodiments.

Referring now to FIG. 3, a network computer 310 (substantially similar to the network computer 110 of FIG. 1) may manage onboarding of entities such as a user device 302 (substantially similar to the user device 102 of FIG. 1), an access device 304 (substantially similar to the access device 104 of FIG. 1), a resource provider computer 306 (substantially similar to the resource provider computer 106 of FIG. 1), a transport computer 308 (substantially similar to the transport computer 108 of FIG. 1), and an authorizing computer 312 (substantially similar to the authorizing computer 112 of FIG. 1).

At step 320, the network computer 310 may configure and enable access to installment APIs. The network computer 310 may expose a set of APIs which include one or more APIs for the context of installments. As described above with respect to FIG. 2, these APIs may be used by client entities (e.g., an issuer associated with authorizing computer 312, a resource provider associated with resource provider computer 306, etc.) of installments solutions provided by the network computer 310. In some embodiments, in order to access these APIs, the client entities will initially be granted access to API credentials (e.g., in the form of API keys and/or shared secret keys). As part of step 320, the network computer 310 may generate such API key credentials and transmit the credentials to the appropriate entities.

At step 322A, the network computer 310 may onboard the authorizing computer 312 in an installment service. During onboarding, the network computer 310 may issue the authorizing computer 312 an API key specific to the authorizing computer 312. The authorizing computer 312 can later use this key to pass as a query parameter and gain access to functionality appropriate for the authorizing computer 312. In some embodiments, the authorizing computer 312 can register for installment plans. The authorizing computer 312 can define installment plans and installment plan criteria such as pricing, eligibility, etc. The authorizing computer 312 can also provide any other suitable information regarding installment plans to the network computer 310. The network computer 310 can receive the information from the authorizing computer 312 via an API, and store the information as described below with respect to step 328.

At step 322B, the network computer 310 may onboard the transport computer 308 in the installment service. During onboarding, the network computer 310 may issue the transport computer 308 an API key specific to the transport computer 308. The transport computer 308 can later use this key to pass as a query parameter and gain access to functionality appropriate for the transport computer 308. In some embodiments, the transport computer 308 may perform installment processing functionality on behalf of the resource provider computer 306. Alternatively, or additionally, one or more such functions may be performed directly by the resource provider computer 306, in which case the network computer 310 would onboard the resource provider computer 306 with API keys in a similar fashion.

At step 324, the transport computer 308 may set up installments and expose APIs to the resource provider computer. The transport computer 308 may use the keys received from the network computer 310 to generate an encryption key and outbound key credentials. The transport computer 308 may execute installment offering setup operations such as configuring contracts, pricing, and the like. The transport computer 308 may expose APIs to the resource provider computer for requesting installment information and processing.

At step 326, the resource provider computer 306 may set installment criteria/parameters and enable the access device 304. The installment criteria may specify conditions under which the resource provider decides to offer an installment. For example, such criteria may specify that transactions above a certain amount should be offered installment payments. As another example, the installment criteria may prioritize certain users (e.g., preference is given to new customers, or customers enrolled in a loyalty program). The resource provider computer 306 may transmit information (e.g., keys, updated code, etc.) to the access device 304 to enable the access device to perform installment related functionality.

At step 328, the network computer 310 stores the criteria (e.g., installment parameters) established by the resource provider computer 306. Alternatively, or additionally, the network computer 310 may further store authorizing entity criteria received from the authorizing computer 312. As another example, a user may provide criteria. For example, a user may establish installment criteria for push payments via a banking application, and the banking application back-end (e.g., an authorizing computer) may provide the user criteria via API. The installment parameters may specify conditions under which an entity such as the resource provider or authorizing entity decides to offer an installment. The network computer 310 may store the installment parameters to the installment plan data store, as described above with respect to FIG. 2. The network computer 310 may store the installment parameters in association with the entities that established the installment parameters. For example, the network computer 310 may store the received installment plan parameters in association with an identifier of the authorizing computer 312/authorizing entity or an identifier of the resource provider computer 308/resource provider (e.g., a resource provider identifier). Alternatively, or additionally, the transport computer 308 may store the criteria.

At step 330, the access device 304 is updated. The access device 304 may update its user experience flows to include an installment workflow. The access device 304 may further upgrade its terminal software to integrate with the installments API.

Figure 6:
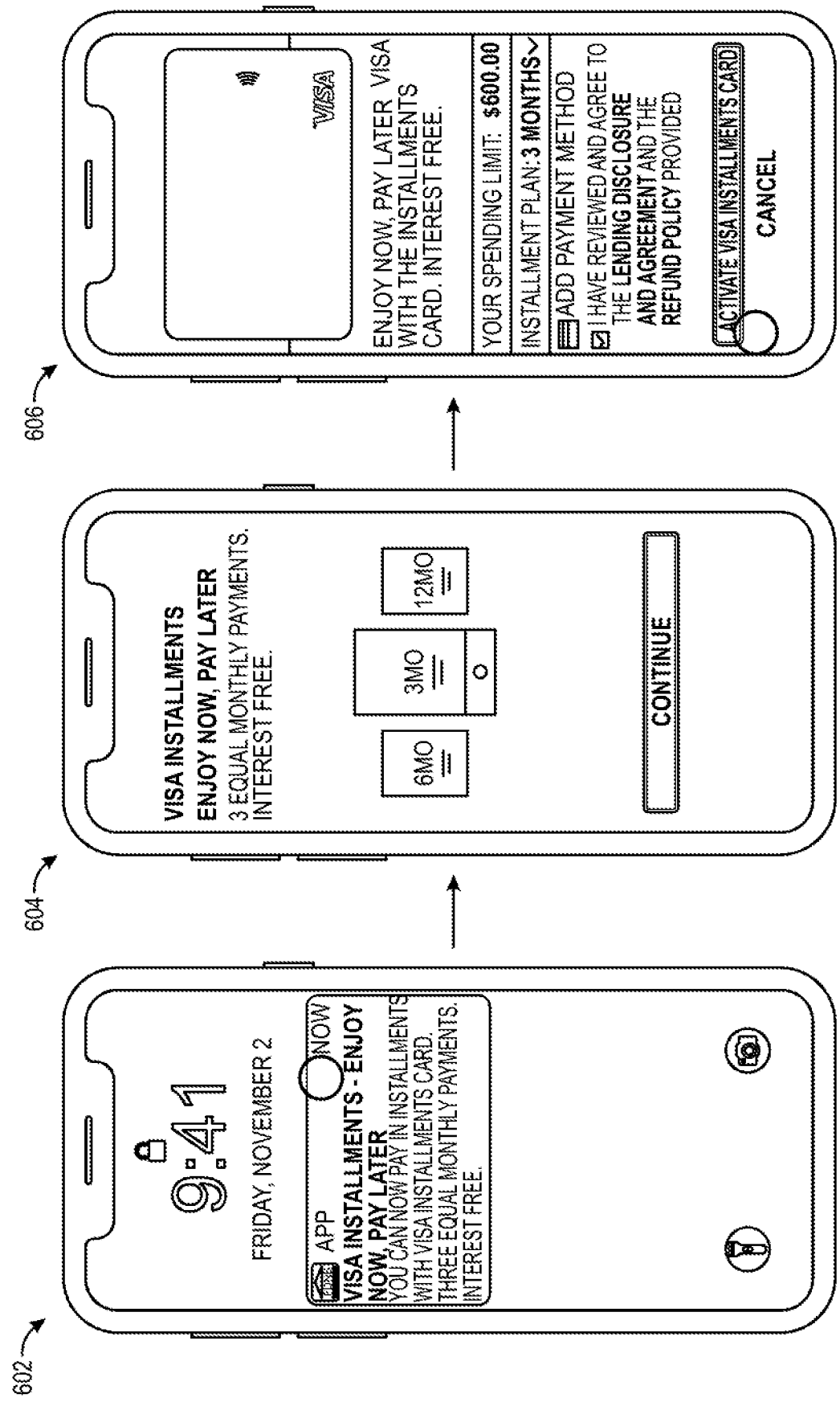
FIG. 6 illustrates an example of interfaces for user onboarding for an installment plan, according to some embodiments.

At step 332, the network computer 310 may transmit a notification to the user device 302 indicating that installments are now available. At step 334, the user device 302 may receive the notification from the network computer 310 that installments are now available. The network computer 310 may provide, to the user device 302, a Graphical User Interface (GUI). Providing a GUI may include transmitting information which may be used by the user device 302 in rendering and displaying a GUI based on instructions established by the network computer 310. The GUI may display information about installment availability, as illustrated in FIG. 6.

FIG. 4 illustrates techniques 400 for selecting and establishing an installment plan during an interaction, according to some embodiments. A network computer 410 (substantially similar to the network computer 110 of FIG. 1) may manage installment plan setup for entities such as a user 402 (e.g., via a user device such as user device 102 of FIG. 1) an access device 404 (substantially similar to the access device 104 of FIG. 1), a resource provider computer 406 (substantially similar to the resource provider computer 106 of FIG. 1), a transport computer 408 (substantially similar to the transport computer 108 of FIG. 1), and an authorizing computer 412 (substantially similar to the authorizing computer 112 of FIG. 1).

At step 420, the user 402 can initiate an interaction, such as a purchase. This may be at a resource provider location. For example, a user device can initiate the interaction with an access device by swiping a card, tapping a NFC-enabled device, and/or typing in information. Interaction data may be generated and transmitted to the access device 404 as a result. Alternatively, or additionally, the interaction may be on a user device such as a laptop or smartphone (e.g., for online shopping). As yet another example, the interaction may be for a push payment (also referred to as a push interaction) between users. A first user may initiate a push payment to a second user, e.g., via an application on a user device.

At step 422, the access device 404 and/or resource provider computer 406 may call the installment eligibility check API. The call may be in the form of an installment information request message. The appropriate entity, with keys for accessing the installment eligibility check API may pass the necessary keys or derivatives thereof, along with interaction data, to the network computer 410. This may be executed directly (e.g., resource provider computer 406 performs a GET call on the installment eligibility check API). Alternatively, or additionally, at step 424, the transport computer 408 may manage access to the API and perform such a call on behalf of the resource provider computer 406 and/or access device 404. In any event, the network computer 410 receives, via the API, interaction data related to the interaction, which may include a total transaction amount, account number (e.g., Primary Account Number (PAN) of a payment card for the interaction, user identifier, merchant identifier, and/or the like.

At step 428, the network computer 410 may identify eligible plan options. Based on the interaction data received via the API, the network computer may query the installment search data store. The network computer 410 may use the stored installment plan parameters, with the interaction data, to execute a query to identify one or more eligible installment plans. For example, based on a transaction amount of $200, user identifier, bank identifier (e.g., retrieved from a received PAN), and merchant identifier, the network computer 410 determines that the interaction is eligible for three installment plans: two payments of $100, four payments of $50, or eight payments of $25.

At step 426, the network computer 410 may return the eligible plan options identified at 424 via the API. The network computer 410 may return the eligible plan options responsive to the call received at 424 or 422.

In some embodiments, if the transport computer 408 receives the API response, the transport computer may apply plan prioritization logic at 430. For example, the transport computer 408 may store data specifying that the resource provider wishes to display the installment plans with the highest monthly payments highest in a list of installment plans. Alternatively, in some embodiments, the transport computer may push the installment plan options directly to the access device 404.

Figure 7:
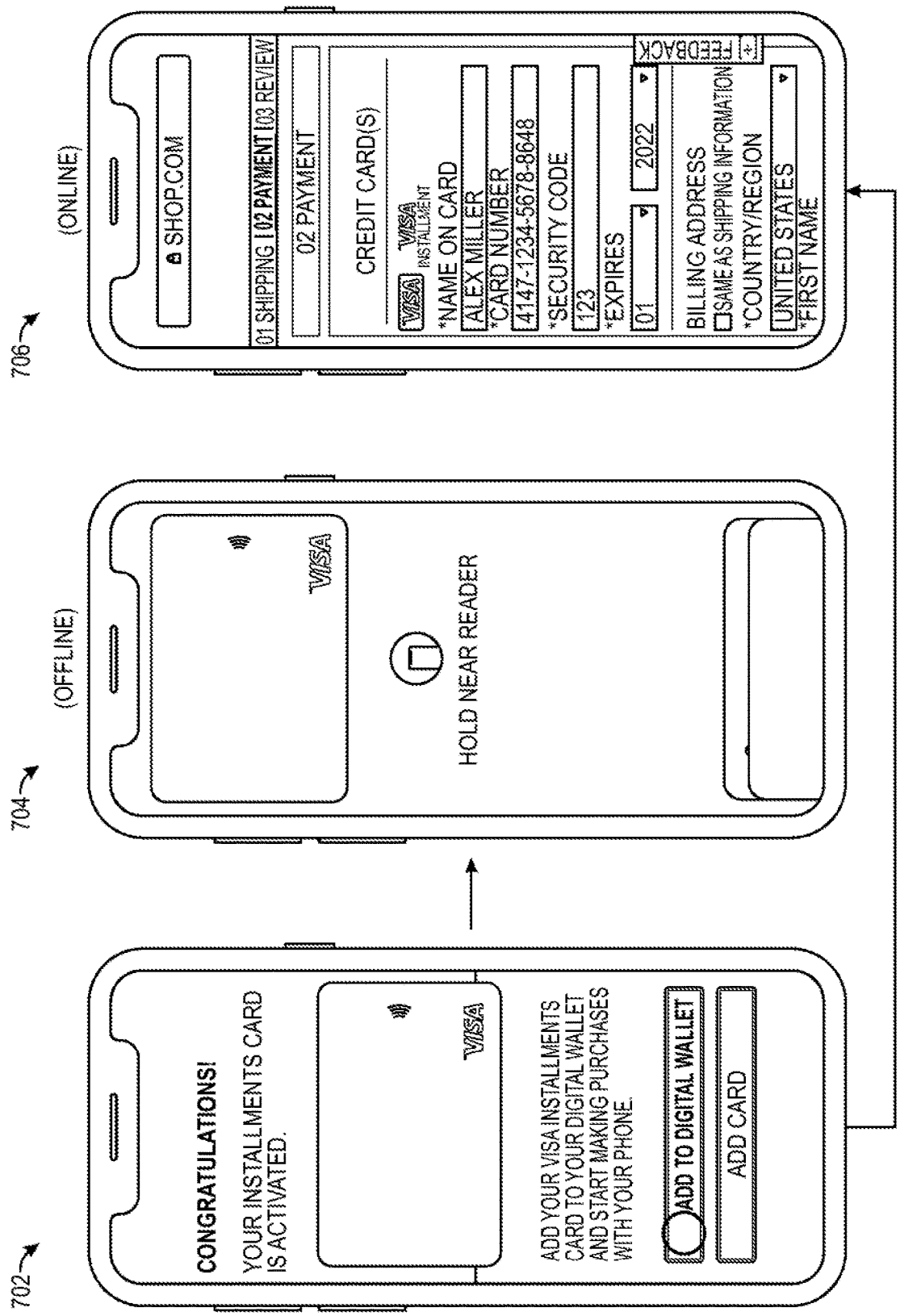
FIG. 7 illustrates an example of interfaces for initiating an interaction with an installment plan, according to some embodiments.
Figure 10:
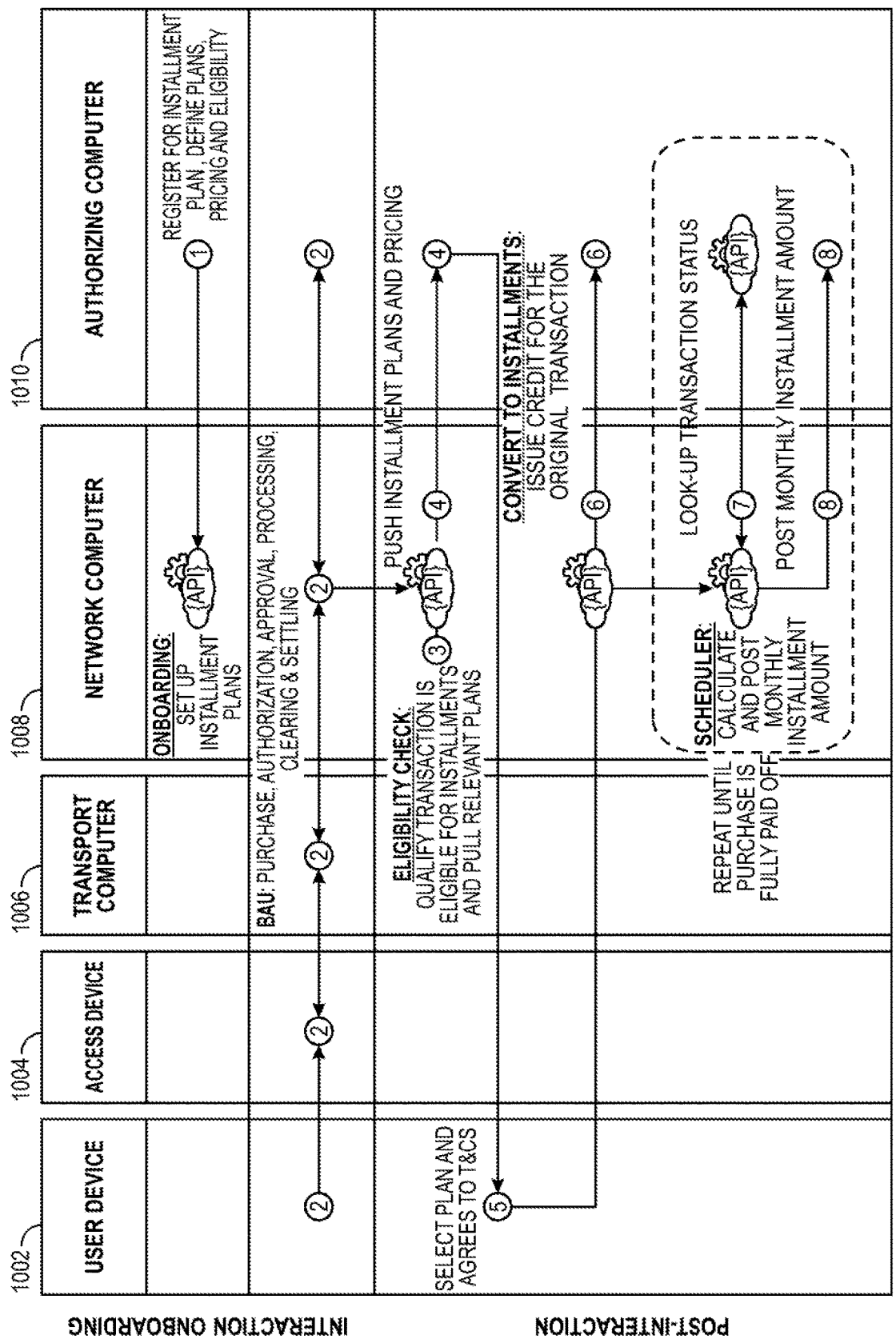
FIG. 10 illustrates a method for converting a transaction to installments, according to some embodiments.
Figure 11:
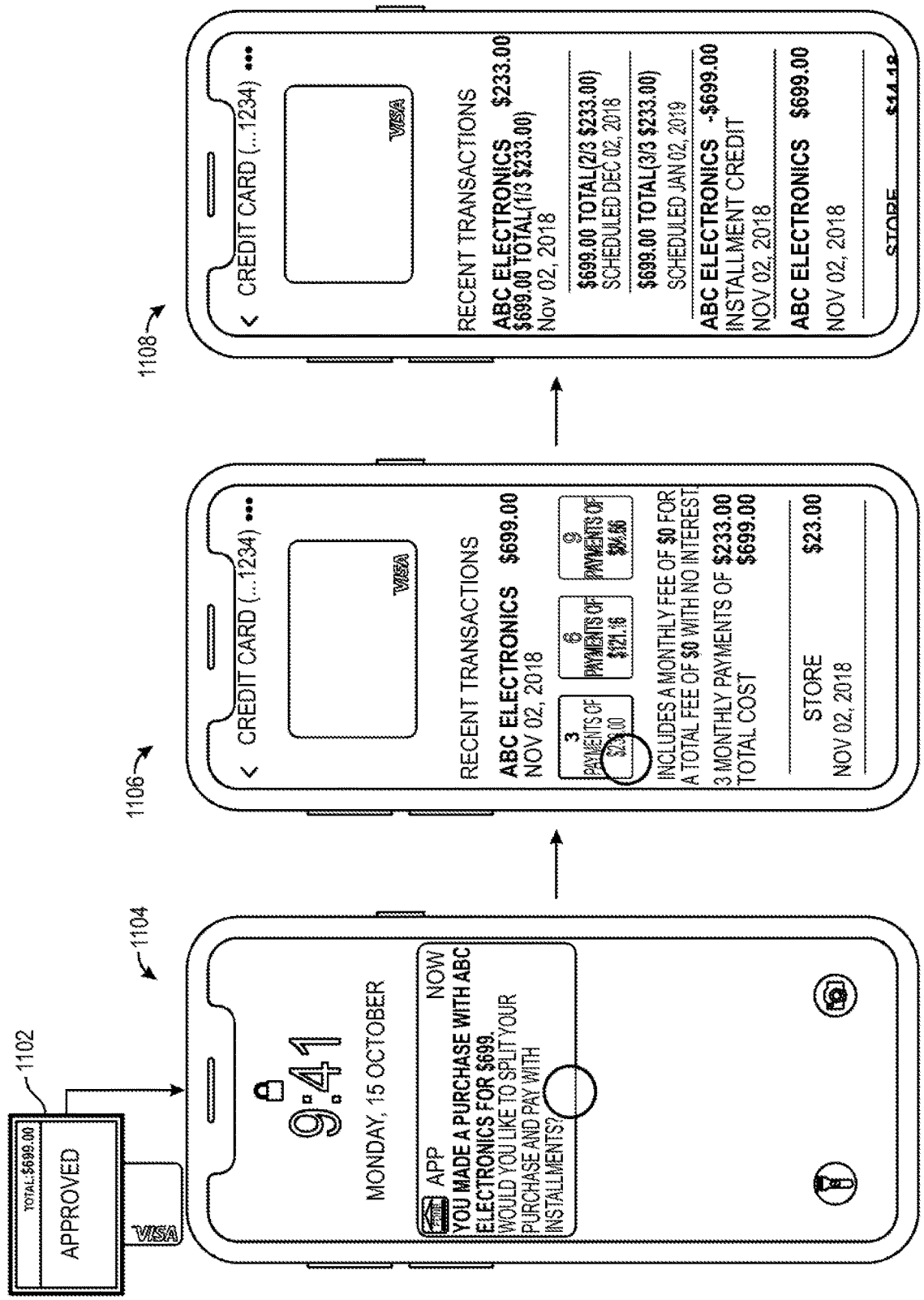
FIG. 11 shows example interfaces and operations for a post-interaction process according to embodiments.

Although steps 426-430 are illustrated as part of the interaction in 400, in some embodiments, the network computer 410 may identify and provide eligible plan options before the interaction (e.g., as illustrated in FIGS. 6 and 7) and/or after the interaction (e.g., as illustrated in FIGS. 10 and 11). As one example, the network computer may identify and provide eligible plan options in batches, which can greatly speed up the process of determining eligibility for multiple installment plans. In this case, before the interaction, the network computer may receive from a resource provider computer via an API exposed by the network computer a batch request to check installment plan eligibility for a plurality of accounts. The API may be a first API, e.g., the eligibility check API. The network computer 410 may determine batch data including installment plan eligibility for each account, by querying based on account parameters as described above with respect to step 426. The network computer 410 may transmit to the resource provider computer 406 a notification comprising a batch identifier corresponding to the batch data and a callback Uniform Resource Locator (URL). The resource provider computer 406 may then use the batch identifier and the callback URL to retrieve the batch data. The network computer may receive, from the resource provider computer via a second API exposed by the network computer, a request for the batch data corresponding to the batch identifier. The second API may be another API configured to push batch data (e.g., a batch data API). Via the second API, the network computer may provide the batch data responsive to the request received via the second API.

Figure 8:
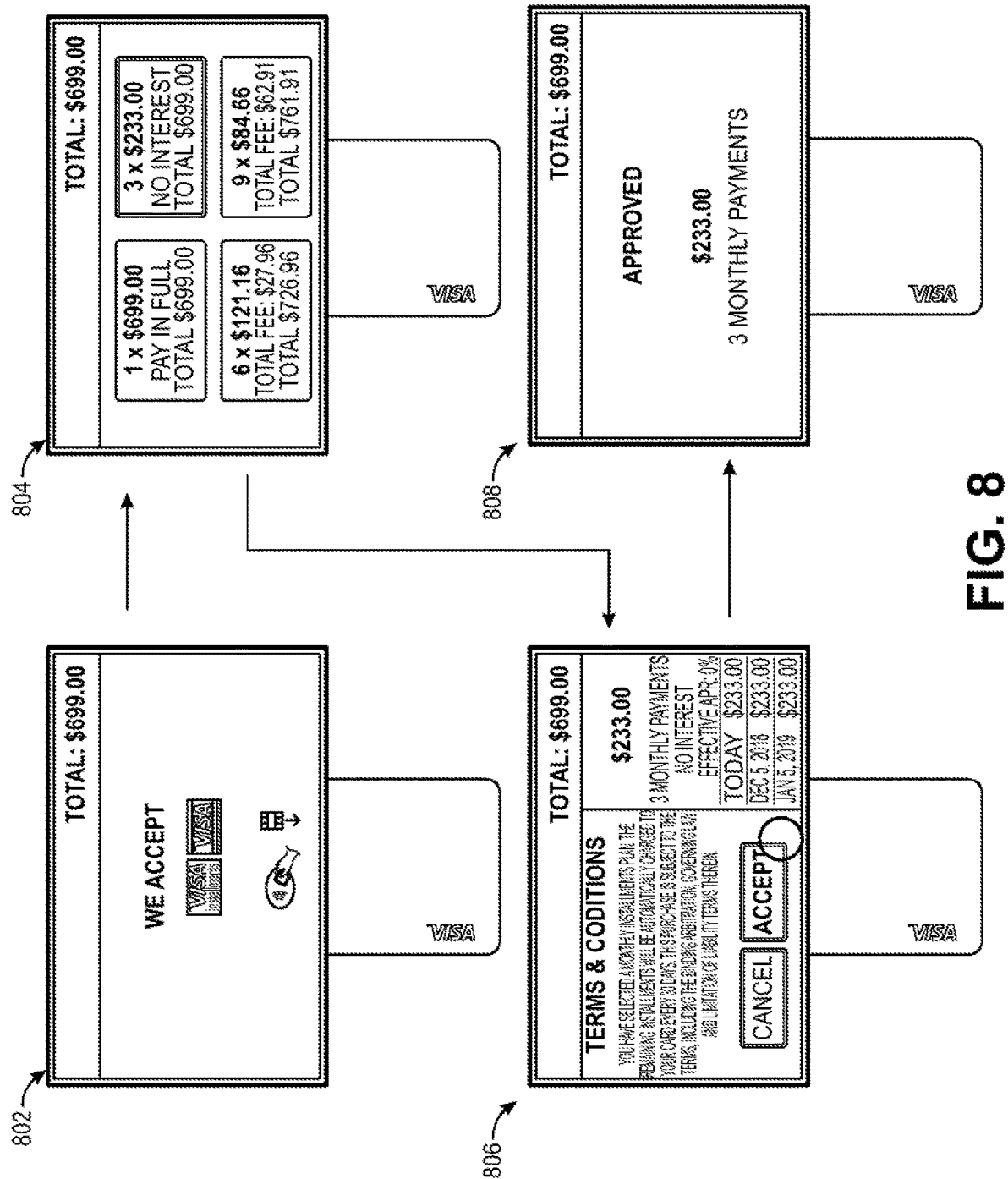
FIG. 8 illustrates an example of steps and interfaces for conducting an interaction with an installment plan at an access device, according to some embodiments.

At step 432, the access device 404 may display the received installment plan options. The access device may, for example, display a list of installment plan options via a POS terminal (e.g., as illustrated in FIG. 8). Alternatively, or additionally, the received installment plan options may be displayed via a GUI on a user device At step 434, the user 402 may review and select an installment plan. The user 402 may, for example, tap a touchscreen or press a button to select a particular installment plan. Responsive to receiving an indication of the selected installment plan, the access device 404 (or user device) may display terms and conditions (T&Cs). The user may accept the T&Cs at 436 to continue with the installment plan.

At step 438, responsive to receiving an indication of the selected payment plan and the acceptance of the T&Cs, the access device may prepare and transmit an authorization request message, with an identifier of the selected installment plan. The authorization request message is for the full amount (e.g., the purchase price of the interaction, regardless of the selected installment plan). The resource provider computer 406 may forward the authorization request message to the transport computer 408 and/or network computer 410.

At step 440A, responsive to receiving the authorization request message, the network computer 410 may analyze the authorization request message and transmit the authorization request message to the authorizing computer 412. At 442, the authorizing computer 412 may receive the authorization request, as well as prepare and send an authorization response back to the network computer 410 indicating whether the interaction is approved or declined.

At step 444, if the interaction is approved, then the network computer 410 processes clearing records and records and stores plan selection information. The interaction may be cleared in full (e.g., for the total transaction amount) at this point. The network computer 410 may store information about the selected plan (e.g., a plan identifier), along with pertinent interaction data such as the total amount of the transaction, PAN, merchant identifier, and/or the like.

At step 440B, the network computer 410 transmits an authorization response message to the access device 404, which may be transmitted via the transport computer 408 and/or the resource provider computer 406. The network computer 410 may further transmit a plan confirmation message regarding the installment plan to the resource provider computer 406 and/or access device 404. The plan confirmation message may indicate that the installment plan has been accepted and initiated, as well as information such as the installment time, installment amount for each payment, total amount, and so forth.

At step 446, the access device 404 may provide the user 402 with a receipt. The receipt may include installment information such as the installment plan, the total amount, the installment amount per installment payment, and the number of installments. At step 448, the user 402 receives the receipt.

FIG. 5 illustrates a schematic diagram of techniques 500 for post-interaction installment processing according to some embodiments. A network computer 510 (substantially similar to the network computer 110 of FIG. 1) may manage installment plan processing for entities such as a user 502 (e.g., via user device 102 of FIG. 1), a resource provider computer 506 (substantially similar to the resource provider computer 106 of FIG. 1), a transport computer 508 (substantially similar to the transport computer 108 of FIG. 1), and an authorizing computer 512 (substantially similar to the authorizing computer 112 of FIG. 1).

At step 520A, the resource provider computer 506 may transmit, to the transport computer 508, a settlement request message. The settlement request message may request funding for the total amount of an interaction (e.g., as established at steps 420 and 422 of FIG. 4). The settlement request message may further include additional data such as interaction data (e.g., timestamp, transaction identifier, etc.) and/or an installment plan identifier. At step 520B, the transport computer 508 may transmit the settlement request message to the network computer 510.

The transport computer 508 may receive the settlement request message and analyze data therein (e.g., installment plan identifier). The transport computer 508 may identify that an installment plan is associated with the settlement request. At step 520C, the transport computer 508 may transmit the settlement request message to the authorizing computer 512, which is received by the authorizing computer at step 520D.

Responsive to receiving the settlement request message, the authorizing computer 512 may analyze the settlement request message and determine to proceed with settlement. At step 522A, the authorizing computer 512 may transmit a settlement response message, for the total amount, to the network computer. At step 522B, the network computer 510 may transmit the settlement response message to the transport computer 508. At step 522C, the transport computer 508 may transmit the settlement response message to the resource provider computer 506. At step 522D, the resource provider computer 506 may receive the settlement response message. Settlement may be completed for the full amount. For example, if the user 502 purchased a resource (e.g., a television) that cost $699.00, then the authorizing computer 512 can settle with the network computer 510 and the transport computer 508 for the same cost, $699.00.

At step 524, the network computer 510 may set up an installment record. In some embodiments, the installment record may be a temporary account. The temporary account may be a virtual account (e.g., the virtual account may exist as a ledger for record keeping purposes). Alternatively, or additionally, the temporary account may be a prepaid account (e.g., the prepaid account may be loaded with funds and limited to the funds loaded). The installment record may be stored to the network computer 510 in association with the installment plan identifier and associated interaction data. For example, the network computer may create a temporary account for the installment plan and an identifier for the temporary account for the installment plan. The network computer may record information including the total amount for the installment plan/interaction to the temporary account associated with the account identifier. Thus, the installment record may be a temporary account with a starting balance of the total amount.

At step 526, the network computer 510 may process an installment. This may occur periodically subject to some condition (e.g., receiving an API call from the authorizing computer and/or determining that an installment time has occurred). In some embodiments, occurrence of an installment time may be when a particular time has elapsed since the last installment and/or since the interaction (e.g., for monthly installments, the network computer 510 may determine that the installment time has occurred when one month has elapsed since the day the transaction was authorized). In some embodiments, the installment time may be computed based on the installment period (e.g., begin processing monthly installment after two weeks to account for messaging and fund transfer times). Processing the installment is further detailed below with respect to FIG. 9.

At step 528, the authorizing computer 512 may process the installment and send a statement to the user 502. For example, based on information received from the network computer 510, the authorizing computer 512 may determine that the user 502 should be charged an installment amount of $133 on the statement. The authorizing computer 512 may prepare a statement with the installment amount and send it to the user 502. The user may receive and view the statement for the installment at step 530.

FIG. 6 illustrates an example of interfaces for user onboarding for an installment plan, according to some embodiments. In some embodiments, as indicated above with respect to FIG. 4, installment plan eligibility may be determined prior to initiating an interaction. For example, a particular account or user may be deemed eligible for installment plan(s) based on criteria established by an authorizing entity.

Interface 602 may be displayed on a user device to provide a notification to the user. The notification can notify the user of installment plan availability. For example, as shown in the interface 602, the notification can state "VISA INSTALLMENTS—ENJOY NOW, PAY LATER. You can now pay in installments with Visa Installments card. Three equal monthly payments. Interest free." The notification can include any suitable text notifying the user of available installments plan(s).

Interface 604 may be displayed on a user device illustrating available installment plans. In some embodiments, interface 604 may be displayed responsive to detecting user interaction with interface 602. Interface 604 may provide a user a set of two or more potential installment plans, from which the user selects an installment plan. For example, as shown in interface 604, the user device can display three installment plans. A first plan can be for 3 months, a second plan can be for 6 months, and a third plan can be for 12 months. In some embodiments, a network computer may provide interface 604 after determining that the user is eligible for installment plans based on stored criteria. Via interface 604, the user can select an installment plan. The user device can receive the user's selection.

Interface 606 may be displayed on a user device illustrating further information regarding the user's selected installment plan. After receiving the user's selection via interface 604, the user device can display interface 606. Via interface 606, the user can review information such as an installment spend limit and tenure. The user can select, for example, "Activate Visa Installments Card." Upon receiving the confirmation to activate the installment card, the user device can transmit a message regarding the confirmation to a server computer (e.g., a network computer, an authorizing computer, etc.).

FIG. 7 illustrates an example of interfaces and steps for initiating an interaction with an installment plan, according to some embodiments. The interfaces 702, 704, and 706 may be displayed, to a user via a user device, responsive to GUI data provided by a network computer. In some embodiments, the steps shown in FIG. 7 occur after eligible transactions are identified before an interaction, as illustrated and described above with respect to FIG. 6.

Prior to causing display of interface 702, a network computer can provision (or activate) the installment card to a digital wallet associated with the user and/or user device. In some embodiments, a user account can be linked to the installment card. The network computer can activate the installment card. In some embodiments, the server computer can transmit an activation message to the user device. Interface 702 includes a notification: "Congratulations! Your Installments card is activated." The interface 702 may further display a prompt such as "Add to Digital Wallet," which may be associated with a GUI element such as a button for receiving user input triggering adding the installments card to a digital wallet.

Interface 704 may correspond to an offline interface displayed upon selection of the installments card in the digital wallet while offline from any access device. The user device can be used to perform an offline interaction, such as a transaction at a resource provider location. For example, as shown in interface 704, the user device can be brought into near-field communication range with an access device comprising a device reader to trigger display of interface 706.

Interface 706 may correspond to an online interface displayed when the installments card is selected in a mobile wallet on a user device in proximity to an access device with a device reader. For example, as shown in interface 706, the interface may include GUI elements configured to accept user input for conducting an interaction, such as name, card number, security code, expiry date, address, etc., into the user device. In some embodiments, the network computer may provide such information as pre-filled fields. Via interface 706, the user device can be used to perform an online interaction, such as a transaction via a webpage. The interaction can be performed in accordance with a previously selected installment plan (e.g., as selected via interface 604 of FIG. 6).

FIG. 8 illustrates an example of steps and interfaces for conducting a an interaction with an installment plan at an access device, according to some embodiments.

At step 802, a user can initiate an interaction, such as a purchase, at a resource provider location. For example, a user device and/or portable device can initiate the interaction with an access device. Step 802 shows an example access device and portable device. For example, the user can insert their portable device (e.g., payment card) into the access device (e.g., POS).

At step 804, the access device can display installment plan(s). The user can select an installment plan. For example, the user can select, on the access device display, the installment plan that the user wants to proceed with. As shown in FIG. 8, the access device can display four options for the user. A first option is to pay for the $699.00 purchase in full at now. The other three options are for installment plans. The installment plans can be displayed with a number of payments, a frequency, a payment amount, a total payment amount, a fee amount, and/or any other installment plan details.

At step 806, after receiving the selection of the installment plan, the access device can display installment plan details, such as a payment schedule as well as terms and conditions. In some embodiments, the user can review the payment schedule and can accept terms and conditions. The access device can transmit a message to a network computer. The message can include the user's acceptance of the installment plan details. For example, as shown in FIG. 8, the user can be presented with a purchase total, a monthly payment total, a number of months, an interest rate, terms and conditions, a payment schedule includes dates and/or payment amounts, an accept button, and/or a cancel button.

At step 808, after the network computer confirms the user's acceptance of the installment plan details, the access device can display that the installment plan is approved. For example, as shown in FIG. 8, the access device can display "Approved," an amount, and a payment schedule.

Figure 9:
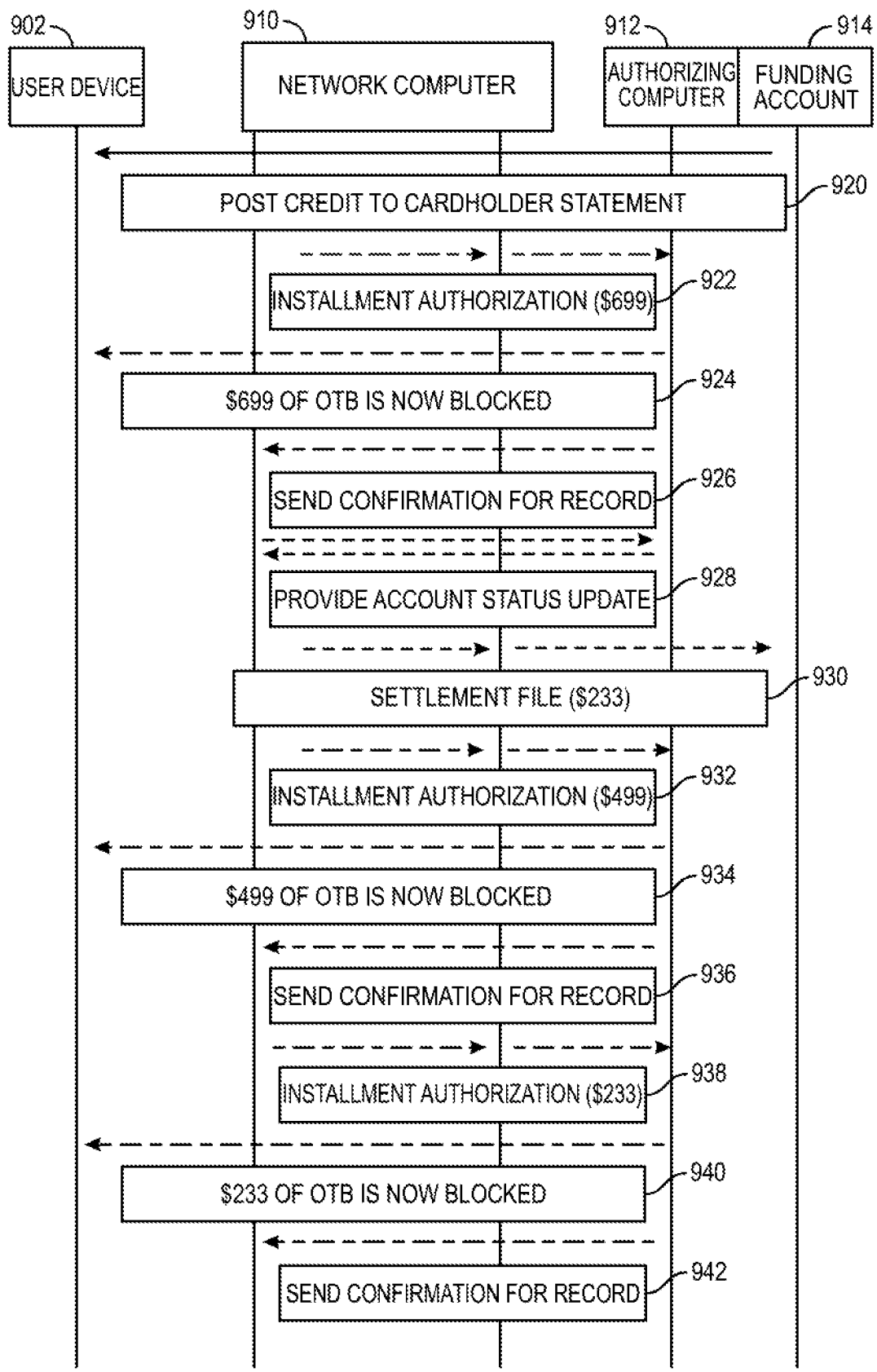
FIG. 9 illustrates example operations for post-interaction installment processing, according to some embodiments.

FIG. 9 illustrates example operations for post-interaction installment processing, according to some embodiments. A network computer 910 (substantially similar to the network computer 110 of FIG. 1) may manage installment processing along with a user device 902 (substantially similar to the user device 102 of FIG. 1) and an authorizing computer 912 (substantially similar to the authorizing computer 112 of FIG. 1), which may hold a funding account 914 for the installment plan.

Prior to the processing depicted in FIG. 9, a transaction may be authorized and cleared based on a total amount for the interaction (e.g., $699). For example, a user purchases a television for $699 using an installment plan tied to his Visa card. This purchase may clear, and the $699 balance is logged to the user's account.

At step 920, a credit may be posted to the cardholder statement. The credit may correspond to the total transaction amount cleared (e.g., $699). The credit shows that the user does not currently owe anything for the purchase. However, in some embodiments, the Open-to-Buy balance on the account (e.g., the available balance given a particular credit limit) should reflect the outstanding amount. At 922, the authorizing computer 912 can receive a first installment authorization message comprising an amount from network computer 910. The network computer 910 may identify such an amount based on stored installment records, and notify the authorizing computer 912 of this amount. In this case, the installment authorization message may indicate the credit of a first amount of $699.

At step 924, the authorizing computer 912 can block the user's credit line based on the first amount, as shown FIG. 9 at "$699 of OTB is now blocked." At step 926, the authorizing computer can then send a confirmation notification to the network computer 910. The network computer 910 may update its records to indicate that the OTB has been blocked. In some embodiments, the authorizing computer 912 and/or network computer 910 may block the user account for a block amount equal to the total amount of the installment plan/initial interaction.

The network computer and/or authorizing computer can then provide account status updates at any suitable time, as indicated at step 928. The network computer may transmit installment data to the authorizing computer. Installment data may include information indicating an amount of an installment payment, a current balance owed on the installments, installment due dates, settlement confirmation of installment payments, and the like. For example, the network computer 910 may notify the authorizing computer 912 that a next installment payment is due. In some embodiments, the authorizing computer 912 may periodically transmit installment payment requests to the user. For example, the authorizing computer 912 may send the user a statement including the installment payment amount due. The authorizing computer 912 may transmit the installment payment request to the user responsive to receiving the installment data from the network computer 910.

At step 930, the network computer 910 can transmit a settlement file (e.g., for $233) to the authorizing computer 912. For example, the authorizing computer can receive payment from the user. This may correspond to the predetermined amount for each installment in the installment plan, and may be triggered upon a particular time period elapsing (e.g., one month for monthly installments). The server computer can then post the settlement file to the issuer funding account 914, where the issuer funding account can reflect the payment of $233.

At step 932, the authorizing computer 912 can then receive a second installment authorization message comprising a second amount from the network computer 910. The second amount may correspond to the total amount for the installment plan ($699) minus the amount paid in the first installment ($233), indicating a $499 balance on the installment plan. At step 934, the authorizing computer 912 (and/or the network computer 910) can block the user's credit line based on the second amount. Responsive to receiving confirmation of an installment payment completed, the authorizing computer 912 and/or network computer 910 may reduce the block amount by an amount of the installment payment to generate an updated block amount (e.g., $499). At step 936, the authorizing computer 912 may send a confirmation to the network computer 910 to use to update the installment record. In other words, the network computer 910 may receive, from the authorizing computer, confirmation of an installment payment of an installment amount completed responsive an installment payment request. Responsive to receiving the confirmation, the network computer may update the installment record.

At step 938, the network computer 910 can transmit an installment authorization (e.g., for updated block amount $233) to the network computer 910. At step 940, the authorizing computer can block the user's credit line (e.g., for $233), and send the network computer 910 a confirmation thereof for the record at 942. The network computer 910 may transmit a notification of the updated block amount to the user and/or authorizing computer 912.

FIG. 10 shows a flowchart illustrating a post-interaction method according to an embodiment of the invention. The method illustrated in FIG. 10 will be described in the context of a user performing an interaction and retroactively accepting an installment plan. It is understood, however, that the invention can be applied to other circumstances. Although the steps are illustrated in a specific order, it is understood that embodiments of the invention may include methods that have the steps in different orders. In addition, steps may be omitted or added and may still be within embodiments of the invention.

At step 1, the authorizing computer 1010 can register for installment plans. The authorizing computer 1010 can define plans, pricing, eligibility, etc. The network computer 1008 can receive the plans, pricing, eligibility, etc. from the authorizing computer 1010 via an API. The authorizing computer 1010 can also provide any other suitable information regarding installment plans to the network computer 1008.

At step 2, the user device 1002, the access device 1004, the transport computer 1006, the network computer 1008, and the authorizing computer 1010 can perform an interaction. For example, the user can initiate an interaction with the access device 1004. In some embodiments the user device 1002 can initiate the interaction with the access device 1004. The access device 1004 can transmit an authorization request message to the transport computer 1006. The transport computer 1006 can forward the authorization request to the network computer 1008. The network computer 1008 can then transmit the authorization request message to the authorizing computer 1010. The authorizing computer 1010 can determine whether or not to authorize the interaction.

After determining whether or not to authorize the interaction, the authorizing computer 1010 can transmit an authorization response message to the access device 1004 via the network computer 1008 and the transport computer 1006.

Furthermore, in some embodiments, the transport computer 1006, the network computer 1008, the authorizing computer 1010, and any other suitable device(s) can perform a clearing and settlement process at any suitable time, for example, at the end of a day.

At step 3, at any suitable point after performing the interaction, the network computer 1008 can determine whether or not the user is eligible for installment plan(s). For example, the network computer 1008 can determine whether or not the user of the user device 1002 is eligible for installment plan(s). For example, the network computer 1008 can determine whether or not the interaction is eligible for installments and can determine and/or pull relevant installment plan(s). After performing the eligibility check, if the user is eligible, the network computer 1008 can transmit the eligible installment plan(s) to the authorizing computer 1010.

In some embodiments, the network computer 1008 can determine that the transaction is eligible for an installment plan by analyzing attributes associated with the transaction, the merchant, and/or the account identifier. The network computer 1008 can also create an installment plan after determining that the transaction is eligible. The network computer 1008 can create any suitable number of installment plans. The network computer 1008 can then transmit the installment plan to an issuer of the account identifier, wherein the issuer thereafter communicates directly with the user to present the installment plan to the user.

At step 4, after receiving the eligible installment plan(s), the authorizing computer 1010 can transmit the eligible installment plan(s) to the user device 1002. In some embodiments, the authorizing computer 1010 can select one or more installment plans of the eligible installment plan(s) to transmit to the user device 1002.

At step 5, after receiving the installment plans from the authorizing computer 1010, the user device 1002 can display the installment plans to the user. The user can select an installment plan and can agree to the terms and conditions. The user device 1002 can receive the selected installment plan. The user device 1002 can then transmit the selected installment plan to the network computer 1008.

At step 6, after receiving the selected installment plan from the user device 1002, the network computer 1008 can convert the previously performed interaction to the installment plan. For example, the network computer 1008 can issue a credit for the amount of the interaction to the authorizing computer 1010.

In some embodiments, the network computer 1008 can receive acceptance of the installment plan by the user. The network computer 1008 can also then initiate the installment plan.

Steps 7 and 8 can occur at any suitable time after step 6. Steps 7 and 8 can occur periodically until the installment plan is complete. For example, until a purchase amount of a transaction is paid off. At step 7, the authorizing computer 1010 can query the network computer 1008 for a status of the interaction and/or the selected installment plan via an API. The network computer 1008 can respond to the authorizing computer 1010 with any suitable information regarding the query. For example, at step 8, the network computer 1008 can respond with a status of the interaction and/or the selected installment plan.

FIG. 11 shows example interfaces and operations for a post-interaction process (e.g., as described above with respect to FIG. 10) according to embodiments of the invention.

At step 1102, a user can perform an interaction with a resource provider. For example, as shown in FIG. 11, the user can pay for a product with a portable device such as a card at an access device.

At step 1104, a user device can receive an offer to convert the an amount of an interaction to installments. For example, the user device can receive a notification that states "You made a purchase with ABC electronics for $699. Would you like to split your purchase and pay with installments?" The notification any include any suitable text.

At step 1106, the user device can receive a selection from the user. The user can select an installment plan. For example, user device can display three installment plans to the user. The user can select which installment plan that the user wants to use. For example, as shown in FIG. 11, the user can be presented with three installment plans. A first installment plan of 3 payments of $233.00, a second installment plan of 6 payments of $121.16, and a third installment plan of 9 payments of $84.66. The user can select the button displaying the first installment plan, which can be a selected installment plan.

At step 1108, after receiving the selected plan, the user device can display a statement with installment information. The user device can allow the user to review the statement and installment information.

Figure 12:
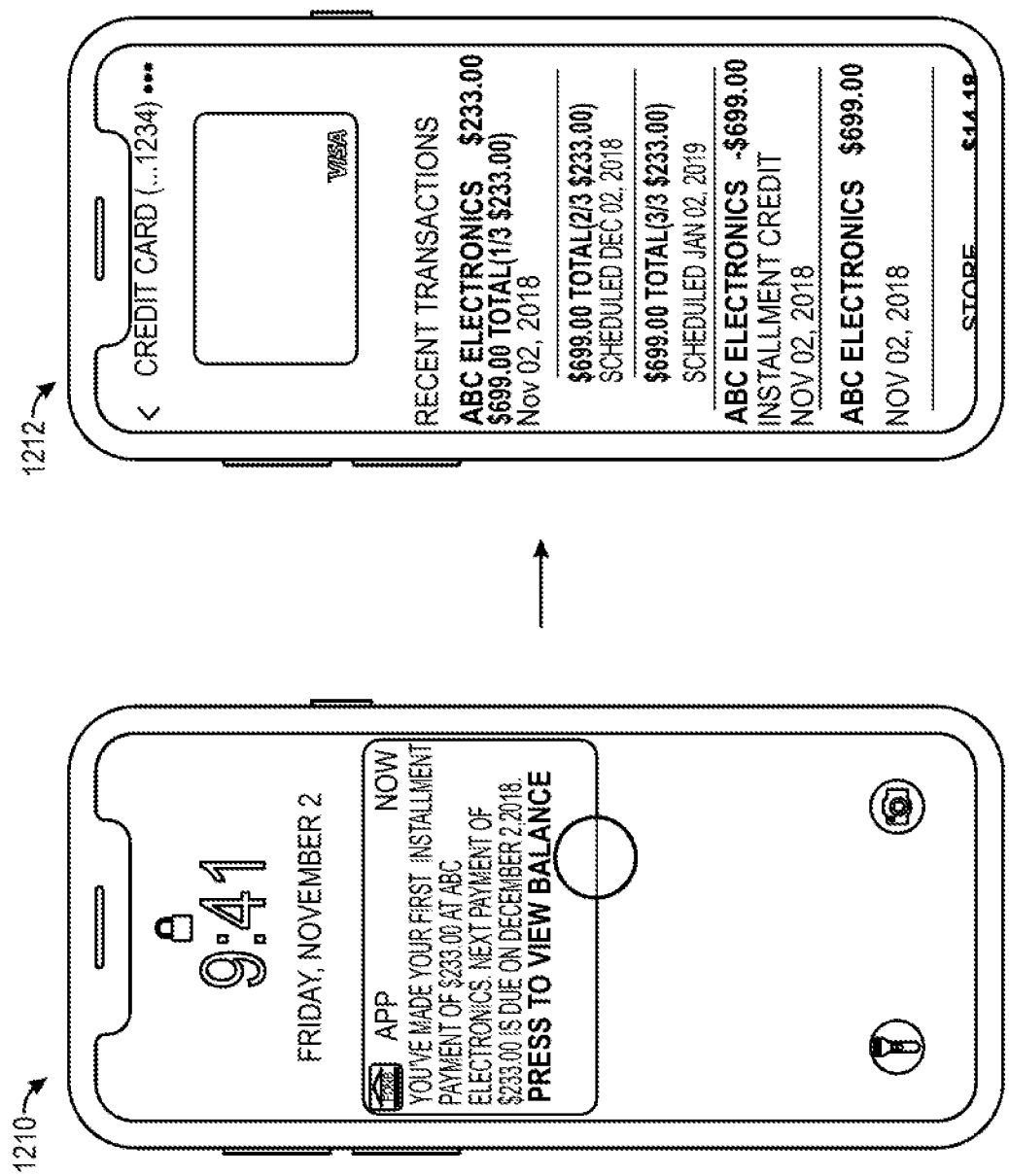
FIG. 12 illustrates example interface for post-interaction installment management, according to some embodiments.

FIG. 12 illustrates example interface for post-interaction installment management, according to some embodiments. Via interface 1210, a user device can receive an alert. The alert can include information regarding installment payments. For example, the alert can state "You've made your first installment payment of $233.00 at ABC Electronics.

Next payment of $233.00 is due on Dec. 2, 2018." The alert can include any suitable message for the user of the user device.

Via interface 1212, the user can review a statement of the installment plan. For example, the user can select the alert on the user device. The user device can then display the statement of the installment plan to the user. The statement of the installment plan can include any suitable information, such as amounts, resource providers, dates, payment schedules, card numbers, scheduled payments, and/or other suitable information regarding installment plan(s). The interfaces 1210 and 1212 may be provided by the network computer, via instructions transmitted to the user device from the network computer. Thus, the network computer may provide a GUI displaying the total amount (e.g., $699 total), the installment amount (e.g., $233), and a remaining amount (e.g., the total amount minus any installments that have been paid).

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A computer-implemented method, performed by a network computer managing a plurality of Application Programming Interfaces (APIs), the method comprising:

transmitting, by the network computer to a merchant computer, a first key for accessing an eligibility API of the plurality of APIs and a second key for accessing an authorization API of the plurality of APIs;

receiving, by the network computer from the merchant computer via a call to the eligibility API, a request message for an installment plan, the request message comprising transaction data for a transaction with a user, the transaction data including an account identifier for an account of the user, a total amount for the installment plan, and the first key or a derivative thereof, wherein the transaction with the user was initiated by a user device transmitting the transaction data to the merchant computer;

determining, by the network computer, that the transaction is eligible for the installment plan by analyzing the transaction data;

based on determining that the transaction is eligible for the installment plan, transmitting, by the network computer via the eligibility API, data identifying the installment plan;

receiving, by the network computer via the eligibility API, acceptance of the installment plan by the user, wherein the user selected and approved the installment plan via an installment interface;

receiving, by the network computer from the merchant computer via a call to the authorization API, an authorization request message for the transaction, the authorization request message comprising an identifier of the installment plan, the total amount, and the second key or a derivative thereof;

responsive to confirming the acceptance and receiving the authorization request message, transmitting, by the network computer to an authorizing computer, the authorization request message for the total amount, thereby causing authorizing and clearing of the total amount;

transmitting, by the network computer to the merchant computer, an authorization response message comprising an indication that the installment plan has been initiated, the total amount, and an installment amount, thereby causing the merchant computer to provide installment information comprising the total amount and the installment amount to the user;

creating, by the network computer, a temporary account for the installment plan and an identifier for the temporary account for the installment plan;

recording, by the network computer, the total amount to the temporary account associated with the identifier for the temporary account; and processing, by the network computer, an installment from the temporary account, thereby decrementing the temporary account by the installment amount, wherein processing the installment from the temporary account comprises:

transmitting, by the network computer to the authorizing computer, a first installment authorization message comprising a first amount, wherein the authorizing computer blocks a credit line of the user based on the first amount; and transmitting, by the network computer to the authorizing computer, a second installment authorization message comprising a second amount, wherein the authorizing computer blocks the credit line of the user based on the second amount.

2. The method of claim 1, wherein:
the determining comprises determining that the transaction is eligible for a plurality of installment plans including the installment plan by analyzing the transaction data; and
the transmitting comprises transmitting, by the network computer to the merchant computer, the plurality of installment plans including the installment plan.

3. The method of claim 1, wherein the request message is an installment information request message, the method further comprising:
receiving, by the network computer, an authorization response message for the transaction from the authorizing computer;
transmitting, by the network computer, the authorization response message for the transaction to the merchant computer; and
transmitting, by the network computer, a plan confirmation message regarding the installment plan to the merchant computer.

4. The method of claim 1, further comprising:
receiving, by the network computer from the authorizing computer, installment plan parameters;
storing, by the network computer, the received installment plan parameters in association with an identifier of the authorizing computer;
retrieving, by the network computer, the stored installment plan parameters; and
using the stored installment plan parameters, with the transaction data, to identify the installment plan.

5. The method of claim 1, further comprising:
receiving, by the network computer from the merchant computer via the eligibility API exposed by the network computer, a batch request to check installment plan eligibility for a plurality of accounts;
determining, by the network computer, batch data comprising installment plan eligibility for each account, of the plurality of accounts; and
providing, by the network computer, the batch data to the merchant computer.

6. The method of claim 5, further comprising:
transmitting, by the network computer to the merchant computer, a notification comprising a batch identifier corresponding to the batch data and a callback Uniform Resource Locator (URL); and
receiving, by the network computer from the merchant computer via a third API exposed by the network computer, a request for the batch data corresponding to the batch identifier, wherein providing the batch data is responsive to the request received via the third API.

7. The method of claim 1, wherein the transaction is between the user and the merchant computer, and the transaction data further includes a merchant identifier.

8. The method of claim 1, wherein:
the user is a first user; and
the transaction is a push interaction between the first user and a second user.

9. A network computer comprising:
a processor;
a memory device; and
a computer readable medium coupled to the processor, the computer readable medium comprising code, executable by the processor, to implement a method comprising:
transmitting, to a merchant computer, a first key for accessing an eligibility API of a plurality of APIs managed by the network computer and a second key for accessing an authorization API of the plurality of APIs;
receiving, from the merchant computer via a call to the eligibility API, a request message for an installment plan, the request message comprising transaction data for a transaction with a user, the transaction data including an account identifier for an account of the user, a total amount for the installment plan, and the first key or a derivative thereof, wherein the transaction with the user was initiated by a user device transmitting the transaction data to the merchant computer;
determining that the transaction is eligible for the installment plan by analyzing the transaction data;
based on determining that the transaction is eligible for the installment plan, transmitting, by the network computer via the eligibility API, data identifying the installment plan;
receiving, by the network computer via the eligibility API, acceptance of the installment plan by the user, wherein the user selected and approved the installment plan via an installment interface;
receiving, from the merchant computer via a call to the authorization API, an authorization request message for the transaction, the authorization request message comprising an identifier of the installment plan, the total amount, and the second key or a derivative thereof;
responsive to confirming the acceptance and receiving the authorization request message, transmitting, by the network computer to an authorizing computer, the authorization request message for the total amount, thereby causing authorizing and clearing of the total amount;
transmitting, to the merchant computer, an authorization response message comprising an indication that the installment plan has been initiated, the total amount, and an installment amount, thereby causing the merchant computer to provide installment information comprising the total amount and the installment amount to the user;
creating a temporary account for the installment plan and an identifier for the temporary account for the installment plan;
recording the total amount to the temporary account associated with the identifier for the temporary account; and
processing an installment from the temporary account, thereby decrementing the temporary account by the installment amount, wherein processing the installment from the temporary account comprises:
transmitting, by the network computer to the authorizing computer, a first installment authorization message comprising a first amount, wherein the authorizing computer blocks a credit line of the user based on the first amount; and
transmitting, by the network computer to the authorizing computer, a second installment authorization message comprising a second amount, wherein the authorizing computer blocks the credit line of the user based on the second amount.

10. The network computer of claim 9, wherein:
the determining comprises determining that the transaction is eligible for a plurality of installment plans including the installment plan by analyzing the transaction data; and
the transmitting comprises transmitting, by the network computer to the merchant computer, the plurality of installment plans including the installment plan.

11. The network computer of claim 9, wherein the request message is an installment information request message and the authorization request message is received from the merchant computer via a transport computer, the method further comprising:

receiving an authorization response message for the transaction from the authorizing computer;

transmitting the authorization response message to the merchant computer via the transport computer; and transmitting a plan confirmation message regarding the installment plan to the merchant computer via the transport computer.

12. The network computer of claim 9, the method further comprising:

receiving, from the authorizing computer, a notification of confirmation of blocking the credit line of the user.

13. The network computer of claim 9, the method further comprising:

receiving, by the network computer from the merchant computer via the eligibility API exposed by the network computer, a batch request to check installment plan eligibility for a plurality of accounts;

determining, by the network computer, batch data comprising installment plan eligibility for each account, of the plurality of accounts;

transmitting, by the network computer to the merchant computer, a notification comprising a batch identifier corresponding to the batch data and a callback Uniform Resource Locator (URL);

receiving, by the network computer from the merchant computer via a third API exposed by the network computer, a request for the batch data corresponding to the batch identifier; and responsive to the request received via the third API, providing, by the network computer, the batch data to the merchant computer.

\* \* \* \* \*